(12) United States Patent
Matsunaga et al.

(10) Patent No.: US 8,040,614 B2
(45) Date of Patent: Oct. 18, 2011

(54) ZOOM LENS AND IMAGE PICKUP DEVICE

(75) Inventors: Shigehiko Matsunaga, Kanagawa (JP);
Koji Toyoda, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 12/926,425

(22) Filed: Nov. 17, 2010

(65) Prior Publication Data

US 2011/0157429 A1 Jun. 30, 2011

(30) Foreign Application Priority Data

Dec. 25, 2009 (JP) ................................. 2009-295244

(51) Int. Cl.
*G02B 15/14* (2006.01)

(52) U.S. Cl. ........ 359/686; 359/557; 359/684; 359/685; 359/687; 359/714; 359/740; 359/763; 359/764

(58) Field of Classification Search .................. 359/557, 359/767, 683–687, 714, 740, 763, 764
See application file for complete search history.

(56) References Cited

U.S. PATENT DOCUMENTS

| | | | | |
|---|---|---|---|---|
| 6,320,698 | B1 * | 11/2001 | Suzuki ........................ | 359/686 |
| 7,221,511 | B2 * | 5/2007 | Toyama ........................ | 359/684 |
| 7,463,427 | B2 | 12/2008 | Nanjo et al. | |
| 2007/0273980 | A1 * | 11/2007 | Horiuchi ........................ | 359/687 |
| 2008/0304162 | A1 * | 12/2008 | Yamasaki ..................... | 359/683 |

FOREIGN PATENT DOCUMENTS

| | | |
|---|---|---|
| JP | 4007258 | 9/2007 |
| JP | 2009-175648 | 8/2009 |

* cited by examiner

*Primary Examiner* — Evelyn A. Lester
(74) *Attorney, Agent, or Firm* — Rader, Fishman & Grauer PLLC

(57) ABSTRACT

Disclosed herein is a zoom lens including a first lens group, a second lens group, a third lens group, a fourth lens group, and a fifth lens group. The zoom lens satisfies following conditional expressions (1) and (2), $$0.03 < H1'/f1 < 0.3 \quad (1)$$

$$0.3 < |f2|/\sqrt{(fw \cdot ft)} < 0.65 \quad (2)$$

where H1' is an interval from a vertex of a surface nearest to the image side in the first lens group to a principal point on the image side of the first lens group (− denotes the object side, and + denotes the image side), f1 is focal length of the first lens group, f2 is focal length of the second lens group, fw is focal length of an entire lens system at a wide-angle end, and ft is the focal length of the entire lens system at a telephoto end.

8 Claims, 17 Drawing Sheets

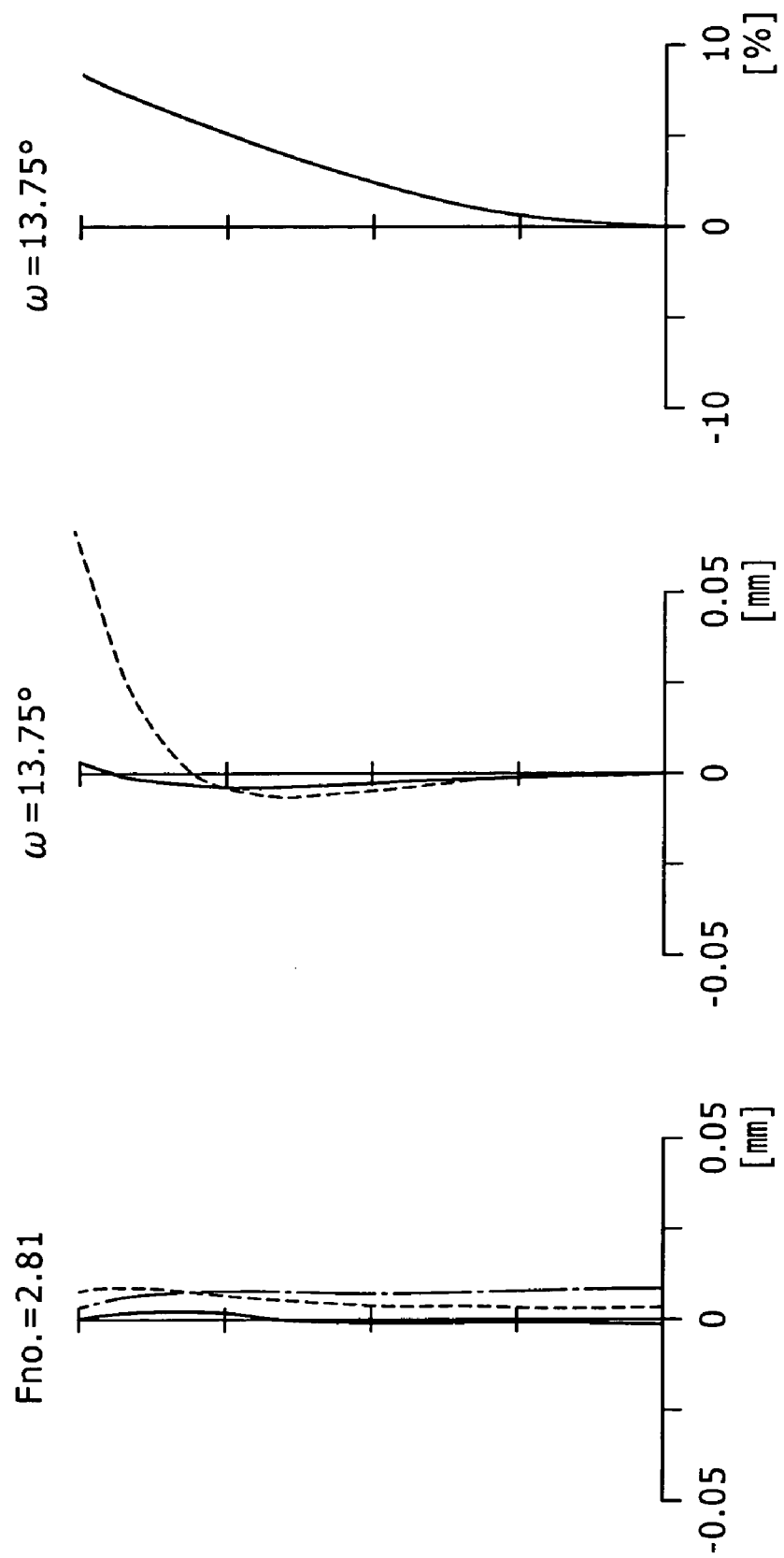

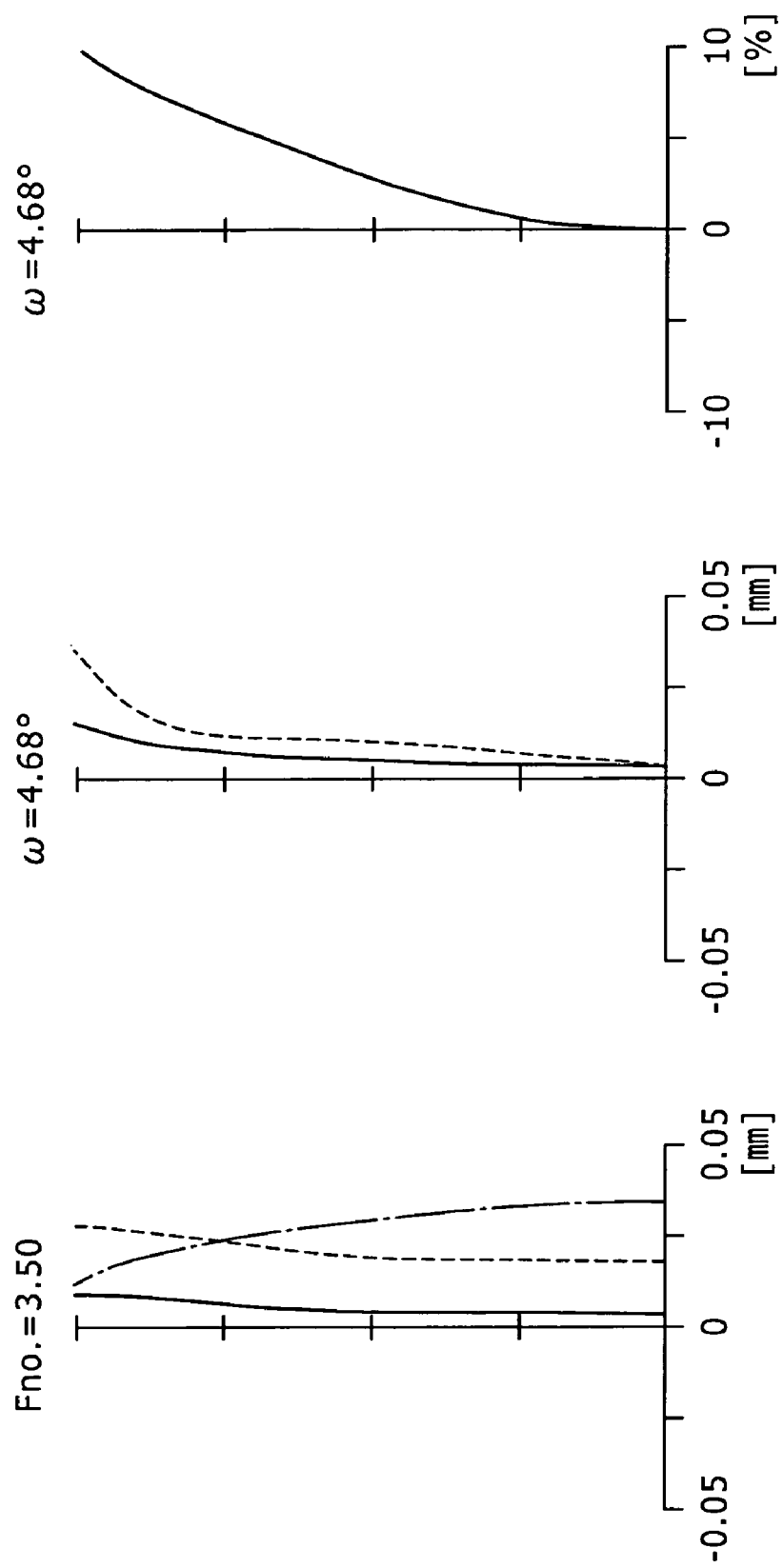

ZOOM LENS AND IMAGE PICKUP DEVICE

BACKGROUND OF THE INVENTION

1. Field of the Invention

The present invention relates to a zoom lens and an image pickup device, and particularly to a zoom lens and an image pickup device that achieve both a wider angle of view and a smaller size while having a high variable power ratio.

2. Description of the Related Art

Recently, image pickup devices such as digital still cameras, digital video cameras and the like have been miniaturized and spread widely for home use. In these image pickup devices, as image pickup elements are miniaturized, miniaturization of an entire lens system and a wide-angle zoom lens having a high variable power ratio and high performance are desired.

It is generally known that a so-called inner focus type zoom lens used in video cameras and achieving focus by moving a lens group other than a first lens group disposed nearest to an object side facilitates miniaturization of an entire lens system and offers image forming performance suitable for an image pickup element having a large number of pixels.

A mainstream system of such an inner focus type zoom lens is such that a first lens group and a third lens group are fixed groups, a second lens group is moved in a direction of an optical axis mainly to vary power, and a fourth lens group is moved in the direction of the optical axis to correct a focal position resulting from power variation and perform focusing (see Japanese Patent Laid-Open No. 2009-175648 referred to as Patent Document 1 hereinafter, for example).

However, in the zoom lens described in Patent Document 1, the first lens group is formed by arranging a cemented lens of a negative lens and a positive lens and a positive lens in order from an object side to an image side, and a half angle of view at a wide-angle end is only about 30°. Thus, when a wider angle of view is to be achieved, the height of off-axis light rays incident on the first lens group is raised, and the effective diameter of the first lens group is increased.

Accordingly, a first lens group in a zoom lens of a four-group inner focus type of a positive group, a negative group, a positive group, and a positive group is composed of five lenses to achieve both a wider angle of view and a smaller size while having a high variable power ratio for diverse variations (see Japanese Patent No. 4007258 referred to as Patent Document 2 hereinafter, for example).

In the zoom lens described in Patent Document 2, a wider angle of view and a smaller size are achieved with a four-group configuration by making the first lens group have a five-lens configuration.

SUMMARY OF THE INVENTION

However, in the zoom lens described in Patent Document 2, a space between a constituent element forming an afocal system and having negative refractive power and a positive constituent element is filled with glass to decrease the inclination of light rays passing through the first lens group. Thus, the thickness of a second lens in the first lens group is increased, which hinders miniaturization.

It is accordingly desirable to overcome the above-described problems and achieve both a wider angle of view and a smaller size while having a high variable power ratio.

According to an embodiment of the present invention, there is provided a zoom lens including a first lens group having positive refractive power and having a position fixed at all times, a second lens group having negative refractive power and made movable in a direction of an optical axis to vary power, a third lens group having positive refractive power and having a position fixed at all times, a fourth lens group having positive refractive power and made movable in the direction of the optical axis to correct a focal position resulting from power variation and perform focusing, and a fifth lens group having positive refractive power, the first lens group, the second lens group, the third lens group, the fourth lens group, and the fifth lens group being arranged in order from an object side to an image side, the first lens group being formed by arranging a concave lens, a convex lens, a cemented lens of a concave lens and a convex lens, and a convex lens in order from the object side to the image side, and the zoom lens satisfying following conditional expressions (1) and (2):

$$0.03 < H1'/f1 < 0.3 \quad (1)$$

$$0.3 < |f2|/\sqrt{(fw \cdot ft)} < 0.65 \quad (2)$$

where $H1'$ is an interval from a vertex of a surface nearest to the image side in the first lens group to a principal point on the image side of the first lens group (− denotes the object side, and + denotes the image side), $f1$ is focal length of the first lens group, $f2$ is focal length of the second lens group, $fw$ is focal length of an entire lens system at a wide-angle end, and $ft$ is the focal length of the entire lens system at a telephoto end.

Thus, the refractive power arrangement of each lens is defined such that the image side principal point of the first lens group is located sufficiently nearer to the image side than the surface nearest to the image surface side in the first lens group, and the refractive power of the second lens group is made appropriate.

In the above-described zoom lens, it is desirable that the second lens group be formed by arranging a biconcave lens and a cemented lens of a biconcave lens and a biconvex lens in order from the object side to the image side and satisfy the following conditional expression (3):

$$0.8 < f21/f2 < 1.6 \quad (3)$$

where $f21$ is focal length of the lens located nearest to the object side in the second lens group.

By forming the zoom lens as described above, the refractive power of the biconcave lens located nearest to the object side in the second lens group is made appropriate.

In the above-described zoom lens, it is desirable that the lens disposed nearest to the object side in the first lens group be a compound aspheric lens.

When the lens disposed nearest to the object side in the first lens group is a compound aspheric lens, occurrence of distortion aberration at a wide-angle end and spherical aberration at a telephoto end are suppressed.

According to an embodiment of the present invention, there is provided another zoom lens including a first lens group having positive refractive power and having a position fixed at all times, a second lens group having negative refractive power and made movable in a direction of an optical axis to vary power, a third lens group having positive refractive power and having a position fixed at all times, a fourth lens group having positive refractive power and made movable in the direction of the optical axis to correct a focal position resulting from power variation and perform focusing, and a fifth lens group having a movable group made movable in a direction perpendicular to the optical axis and having positive refractive power, the first lens group, the second lens group, the third lens group, the fourth lens group, and the fifth lens group being arranged in order from an object side to an image side, the first lens group being formed by arranging a concave lens, a convex lens, a cemented lens of a concave lens and a convex lens, and a convex lens in order from the object side to the image side, the second lens group being formed by arranging a biconcave lens and a cemented lens of a biconcave lens and a biconvex lens in order from the object side to the image side, and the zoom lens satisfying following conditional expressions (1), (2), and (3):

$$0.03 < H1'/f1 < 0.3 \qquad (1)$$

$$0.3 < |f2|/\sqrt{(fw \cdot ft)} < 0.65 \qquad (2)$$

$$0.8 < f21/f2 < 1.6 \qquad (3)$$

where H1' is an interval from a vertex of a surface nearest to the image side in the first lens group to a principal point on the image side of the first lens group (− denotes the object side, and + denotes the image side), f1 is focal length of the first lens group, f2 is focal length of the second lens group, fw is focal length of an entire lens system at a wide-angle end, ft is the focal length of the entire lens system at a telephoto end, and f21 is focal length of the lens located nearest to the object side in the second lens group.

Thus, the refractive power arrangement of each lens is defined such that the image side principal point of the first lens group is located sufficiently nearer to the image side than the surface nearest to the image surface side in the first lens group, and the refractive power of the second lens group is made appropriate.

In the above-described other zoom lens, it is desirable that the lens disposed nearest to the object side in the first lens group be a compound aspheric lens.

When the lens disposed nearest to the object side in the first lens group is a compound aspheric lens, occurrence of distortion aberration at a wide-angle end and spherical aberration at a telephoto end are suppressed.

In the above-described other zoom lens, it is desirable that the fifth lens group be formed by arranging a front group having negative refractive power and a rear group having positive refractive power in order from the object side to the image side, and that one of the front group and the rear group of the fifth lens group be the movable group moving in the direction perpendicular to the optical axis, so that an image formed on an image surface is movable in the direction perpendicular to the optical axis.

By making one of the front group and the rear group of the fifth lens group the movable group, the movable group has a small amount of travel in the direction perpendicular to the optical axis.

According to an embodiment of the present invention, there is provided an image pickup device including: a zoom lens; and an image pickup element for converting an optical image formed by the zoom lens into an electric signal; the zoom lens being formed by arranging, in order from an object side to an image side, a first lens group having positive refractive power and having a position fixed at all times, a second lens group having negative refractive power and made movable in a direction of an optical axis to vary power, a third lens group having positive refractive power and having a position fixed at all times, a fourth lens group having positive refractive power and made movable in the direction of the optical axis to correct a focal position resulting from power variation and perform focusing, and a fifth lens group having positive refractive power, the first lens group being formed by arranging a concave lens, a convex lens, a cemented lens of a concave lens and a convex lens, and a convex lens in order from the object side to the image side, and the zoom lens satisfying following conditional expressions (1) and (2):

$$0.03 < H1'/f1 < 0.3 \qquad (1)$$

$$0.3 < |f2|/\sqrt{(fw \cdot ft)} < 0.65 \qquad (2)$$

where H1' is an interval from a vertex of a surface nearest to the image side in the first lens group to a principal point on the image side of the first lens group (− denotes the object side, and + denotes the image side), f1 is focal length of the first lens group, f2 is focal length of the second lens group, fw is focal length of an entire lens system at a wide-angle end, and ft is the focal length of the entire lens system at a telephoto end.

Thus, the refractive power arrangement of each lens is defined such that the image side principal point of the first lens group is located sufficiently nearer to the image side than the surface nearest to the image surface side in the first lens group, and the refractive power of the second lens group is made appropriate.

According to an embodiment of the present invention, there is provided another image pickup device including: a zoom lens; and an image pickup element for converting an optical image formed by the zoom lens into an electric signal; the zoom lens being formed by arranging, in order from an object side to an image side, a first lens group having positive refractive power and having a position fixed at all times, a second lens group having negative refractive power and made movable in a direction of an optical axis to vary power, a third lens group having positive refractive power and having a position fixed at all times, a fourth lens group having positive refractive power and made movable in the direction of the optical axis to correct a focal position resulting from power variation and perform focusing, and a fifth lens group having a movable group made movable in a direction perpendicular to the optical axis and having positive refractive power, the first lens group being formed by arranging a concave lens, a convex lens, a cemented lens of a concave lens and a convex lens, and a convex lens in order from the object side to the image side, the second lens group being formed by arranging a biconcave lens and a cemented lens of a biconcave lens and a biconvex lens in order from the object side to the image side, and the zoom lens satisfying following conditional expressions (1), (2), and (3):

$$0.03 < H1'/f1 < 0.3 \qquad (1)$$

$$0.3 < |f2|/\sqrt{(fw \cdot ft)} < 0.65 \qquad (2)$$

$$0.8 < f21/f2 < 1.6 \qquad (3)$$

where H1' is an interval from a vertex of a surface nearest to the image side in the first lens group to a principal point on the image side of the first lens group (− denotes the object side, and + denotes the image side), f1 is focal length of the first lens group, f2 is focal length of the second lens group, fw is focal length of an entire lens system at a wide-angle end, ft is the focal length of the entire lens system at a telephoto end, and f21 is focal length of the lens located nearest to the object side in the second lens group.

Thus, the refractive power arrangement of each lens is defined such that the image side principal point of the first lens group is located sufficiently nearer to the image side than the surface nearest to the image surface side in the first lens group, and the refractive power of the second lens group is made appropriate.

The zoom lens and the image pickup device according to the embodiments of the present invention can achieve both a wider angle of view and a smaller size while having a high variable power ratio.

BRIEF DESCRIPTION OF THE DRAWINGS

FIGS. 11A to 11C are diagrams showing spherical aberration, astigmatism, and distortion aberration in an intermediate focal length state;

FIGS. 12A to 12C are diagrams showing spherical aberration, astigmatism, and distortion aberration in a telephoto end state;

DETAILED DESCRIPTION OF THE PREFERRED EMBODIMENTS

Figure 1:
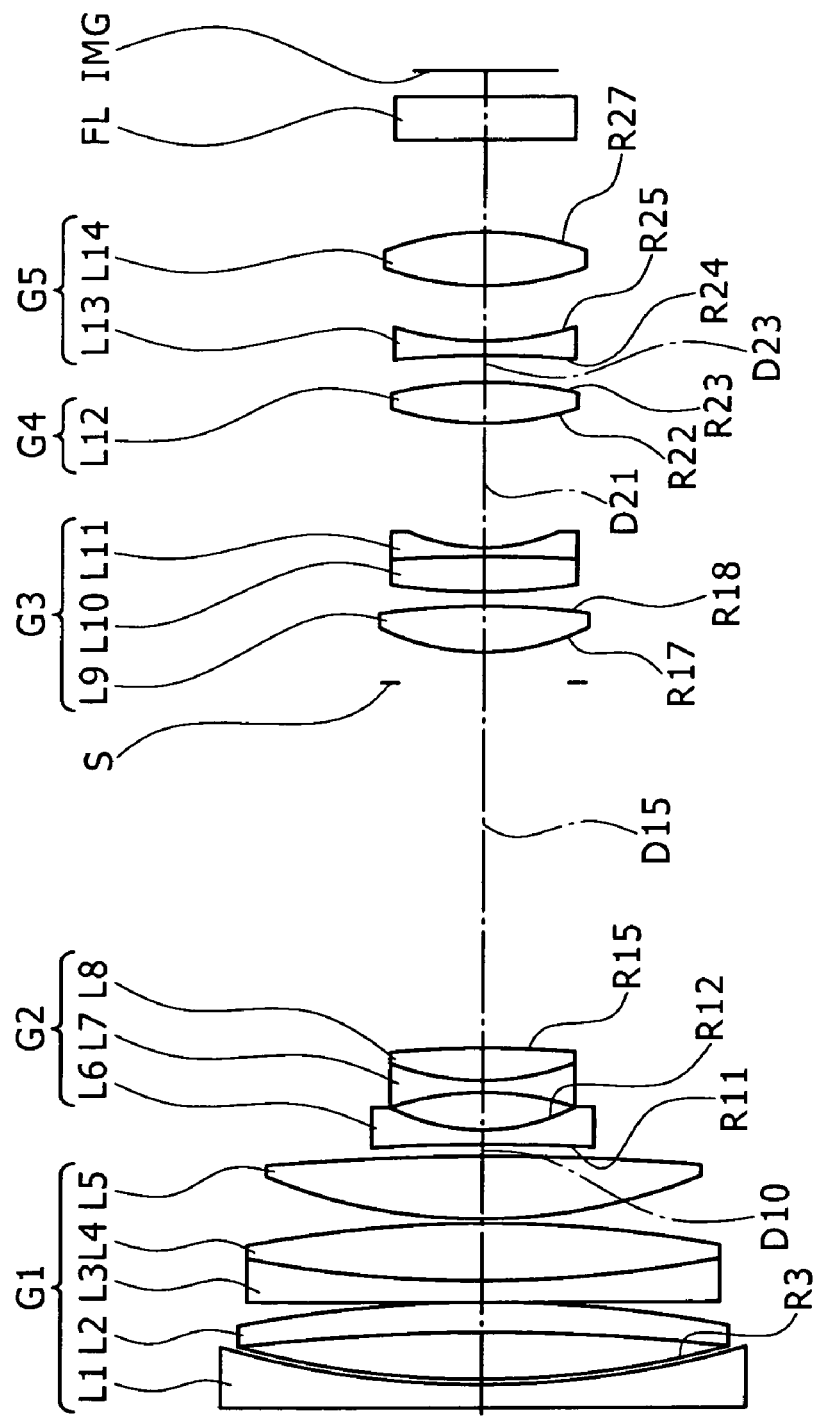
FIG. 1 is a diagram showing a lens configuration of a first embodiment of a zoom lens.

The best mode for carrying out a zoom lens and an image pickup device according to an embodiment of the present invention will hereinafter be described.

[Configuration of Zoom Lens]

A zoom lens according to an embodiment of the present invention is formed by arranging, in order from an object side to an image side, a first lens group having positive refractive power and having a position fixed at all times, a second lens group having negative refractive power and made movable in a direction of an optical axis to vary power, a third lens group having positive refractive power and having a position fixed at all times, a fourth lens group having positive refractive power and made movable in the direction of the optical axis to correct a focal position resulting from power variation and perform focusing, and a fifth lens group having positive refractive power.

In the zoom lens according to the embodiment of the present invention, the first lens group is formed by arranging a concave lens, a convex lens, a cemented lens of a concave lens and a convex lens, and a convex lens in order from the object side to the image side.

Further, the zoom lens according to the embodiment of the present invention satisfies the following conditional expressions (1) and (2):

$$0.03 < H1'/f1 < 0.3 \quad (1)$$

$$0.3 < |f2|/\sqrt{(fw \cdot ft)} < 0.65 \quad (2)$$

where H1' is an interval from a vertex of a surface nearest to the image side in the first lens group to a principal point on the image side of the first lens group (− denotes the object side, and + denotes the image side), f1 is focal length of the first lens group, f2 is focal length of the second lens group, fw is focal length of an entire lens system at a wide-angle end, and ft is the focal length of the entire lens system at a telephoto end.

The conditional expression (1) shows a condition for imparting a configuration suitable for achieving both an increase in angle of view and miniaturization of the lens nearest to the object side to the first lens group.

When H1'/f1 is less than the lower limit of the conditional expression (1), an interval between the principal points of the first lens group and the second lens group is increased, and therefore an increase in angle of view becomes difficult.

When H1'/f1 exceeds the upper limit of the conditional expression (1), on the other hand, the height of off-axis light rays passing through the first lens group is increased, and the diameter of the lens located nearest to the object side in the first lens group is increased.

Thus, when the zoom lens satisfies the conditional expression (1), the refractive power arrangement of each lens is defined such that the image side principal point of the first lens group is located sufficiently nearer to the image side than the surface nearest to the image surface side in the first lens group, and an increase in angle of view and miniaturization of the lens nearest to the object side in the first lens group can both be achieved.

The conditional expression (2) defines the refractive power of the second lens group functioning mainly as a power varying lens group.

When |f2|/√(fw·ft) is less than the lower limit of the conditional expression (2), the refractive power of the second lens group becomes too strong, a Petzval sum is increased to a negative side, and the correction of field curvature becomes difficult.

When |f2|/·(fw·ft) exceeds the upper limit of the conditional expression (2), on the other hand, the refractive power of the second lens group becomes too weak, and an amount of travel of the second lens group needs to be increased to achieve a desired variable power ratio, thus inviting an increase in size of the zoom lens.

Thus, when the zoom lens satisfies the conditional expression (2), the refractive power of the second lens group is made appropriate. It is therefore possible to excellently correct field curvature and miniaturize the zoom lens with the amount of travel of the second lens group reduced.

Being formed as described above, the zoom lens according to the embodiment of the present invention can achieve a variable power ratio of 8 to 20 times and a half angle of view of 35° to 45°.

In the zoom lens according to one embodiment of the present invention, it is desirable that the second lens group be formed by arranging a biconcave lens and a cemented lens of a biconcave lens and a biconvex lens in order from the object side to the image side and satisfy the following conditional expression (3):

$$0.8 < f21/f2 < 1.6 \quad (3)$$

where f21 is focal length of the lens located nearest to the object side in the second lens group.

The conditional expression (3) defines a ratio between the refractive power of the second lens group and the refractive power of the biconcave lens located nearest to the object side in the second lens group.

When f21/f2 exceeds the upper limit of the conditional expression (3), the refractive power of the biconcave lens located nearest to the object side in the second lens group becomes too weak, the height of off-axis light rays passing through the first lens group is increased when a wider angle of view is to be achieved, and the lens located nearest to the object side in the first lens group is increased in size.

When f21/f2 is less than the lower limit of the conditional expression (3), on the other hand, the refractive power of the biconcave lens located nearest to the object side in the second lens group becomes too strong, and the correction of aberration attendant on power variation becomes difficult.

Thus, when the zoom lens satisfies the conditional expression (3), the refractive power of the biconcave lens located nearest to the object side in the second lens group is made appropriate, and it is possible to miniaturize the lens located nearest to the object side in the first lens group and excellently correct aberration attendant on power variation.

In the zoom lens according to one embodiment of the present invention, it is desirable that the lens disposed nearest to the object side in the first lens group be a compound aspheric lens.

When the lens disposed nearest to the object side in the first lens group is a compound aspheric lens, distortion aberration at the wide-angle end and spherical aberration at the telephoto end can be corrected efficiently. In addition, the occurrence of chromatic aberration at the telephoto end can be suppressed by increasing a difference in Abbe number between a material forming an aspheric part and a material forming a part on a body side of the lens other than the aspheric part.

Incidentally, the above-described aberration correction can also be made by an aspheric lens other than a compound aspheric lens.

A zoom lens according to an embodiment of the other present invention is formed by arranging, in order from an object side to an image side, a first lens group having positive refractive power and having a position fixed at all times, a second lens group having negative refractive power and made movable in a direction of an optical axis to vary power, a third lens group having positive refractive power and having a position fixed at all times, a fourth lens group having positive refractive power and made movable in the direction of the optical axis to correct a focal position resulting from power variation and perform focusing, and a fifth lens group having a movable group made movable in a direction perpendicular to the optical axis and having positive refractive power.

In the zoom lens according to the embodiment of the other present invention, the first lens group is formed by arranging a concave lens, a convex lens, a cemented lens of a concave lens and a convex lens, and a convex lens in order from the object side to the image side.

Further, in the zoom lens according to the embodiment of the other present invention, the second lens group is formed by arranging a biconcave lens and a cemented lens of a biconcave lens and a biconvex lens in order from the object side to the image side.

In addition, the zoom lens according to the embodiment of the other present invention satisfies the following conditional expressions (1), (2), and (3):

$$0.03 < H1'/f1 < 0.3 \quad (1)$$

$$0.3 < |f2|/\sqrt{(fw \cdot ft)} < 0.65 \quad (2)$$

$$0.8 < f21/f2 < 1.6 \quad (3)$$

where H1' is an interval from a vertex of a surface nearest to the image side in the first lens group to a principal point on the image side of the first lens group (− denotes the object side, and + denotes the image side), f1 is focal length of the first lens group, f2 is focal length of the second lens group, fw is focal length of an entire lens system at a wide-angle end, ft is the focal length of the entire lens system at a telephoto end, and f21 is focal length of the lens located nearest to the object side in the second lens group.

The conditional expression (1) shows a condition for imparting a configuration suitable for achieving both an increase in angle of view and miniaturization of the lens nearest to the object side to the first lens group.

When H1'/f1 is less than the lower limit of the conditional expression (1), an interval between the principal points of the first lens group and the second lens group is increased, and therefore an increase in angle of view becomes difficult.

When H1'/f1 exceeds the upper limit of the conditional expression (1), on the other hand, the height of off-axis light rays passing through the first lens group is increased, and the diameter of the lens located nearest to the object side in the first lens group is increased.

Thus, when the zoom lens satisfies the conditional expression (1), the refractive power arrangement of each lens is defined such that the image side principal point of the first lens group is located sufficiently nearer to the image side than the surface nearest to the image surface side in the first lens group, and an increase in angle of view and miniaturization of the lens nearest to the object side in the first lens group can both be achieved.

The conditional expression (2) defines the refractive power of the second lens group functioning mainly as a power varying lens group.

When |f2|/√(fw·ft) is less than the lower limit of the conditional expression (2), the refractive power of the second lens group becomes too strong, a Petzval sum is increased to a negative side, and the correction of field curvature becomes difficult.

When |f2|/·(fw·ft) exceeds the upper limit of the conditional expression (2), on the other hand, the refractive power of the second lens group becomes too weak, and an amount of travel of the second lens group needs to be increased to achieve a desired variable power ratio, thus inviting an increase in size of the zoom lens.

Thus, when the zoom lens satisfies the conditional expression (2), the refractive power of the second lens group is made appropriate. It is therefore possible to excellently correct field curvature and miniaturize the zoom lens with the amount of travel of the second lens group reduced.

The conditional expression (3) defines a ratio between the refractive power of the second lens group and the refractive power of the biconcave lens located nearest to the object side in the second lens group.

When f21/f2 exceeds the upper limit of the conditional expression (3), the refractive power of the biconcave lens located nearest to the object side in the second lens group becomes too weak, the height of off-axis light rays passing through the first lens group is increased when a wider angle of view is to be achieved, and the lens located nearest to the object side in the first lens group is increased in size.

When f21/f2 is less than the lower limit of the conditional expression (3), on the other hand, the refractive power of the biconcave lens located nearest to the object side in the second lens group becomes too strong, and the correction of aberration attendant on power variation becomes difficult.

Thus, when the zoom lens satisfies the conditional expression (3), the refractive power of the biconcave lens located nearest to the object side in the second lens group is made appropriate, and it is possible to miniaturize the lens located nearest to the object side in the first lens group and excellently correct aberration attendant on power variation.

In addition, because the fifth lens group has the movable group made movable in the direction perpendicular to the optical axis, the fifth lens group can correct an image blur due to hand movement or the like.

Being formed as described above, the zoom lens according to the embodiment of the other present invention can achieve a variable power ratio of 8 to 20 times and a half angle of view of 35° to 45°.

In the zoom lens according to one embodiment of the other present invention, it is desirable that the lens disposed nearest to the object side in the first lens group be a compound aspheric lens.

When the lens disposed nearest to the object side in the first lens group is a compound aspheric lens, distortion aberration at the wide-angle end and spherical aberration at the telephoto end can be corrected efficiently. In addition, the occurrence of chromatic aberration at the telephoto end can be suppressed by increasing a difference in Abbe number between a material forming an aspheric part and a material forming a part on a body side of the lens other than the aspheric part.

Incidentally, the above-described aberration correction can also be made by an aspheric lens other than a compound aspheric lens.

In the zoom lens according to the embodiment of the other present invention, it is desirable that the fifth lens group be formed by arranging a front group having negative refractive power and a rear group having positive refractive power in order from the object side to the image side, and that one of the front group and the rear group of the fifth lens group be the movable group moving in the direction perpendicular to the optical axis, so that an image formed on an image surface is moved in the direction perpendicular to the optical axis.

By making one of the front group and the rear group of the fifth lens group located nearest to the image side among the first to fifth lens groups a movable group for correcting hand movement, a lens barrel can be miniaturized because the fifth lens group has a relatively small effective diameter for a luminous flux.

In addition, effects of positional variation of the luminous flux in the other lens groups at a time of hand movement correction are small, and thus the lens barrel can be further miniaturized.

Further, there is little limitation for securing a space in front of and in the rear of the movable group, thus making it possible to improve optical performance and miniaturize the lens barrel.

[Numerical Examples of Zoom Lens]

Concrete embodiments of the zoom lens according to the present invention and the zoom lens according to the other present invention and numerical examples in which concrete numerical values are applied to the embodiments will be described in the following with reference to drawings and tables.

Incidentally, the meanings and the like of symbols shown in each table and description in the following are as follows.

"Surface number" indicates an ith surface counted from the object side to the image side. "Ri" denotes the radius of curvature of the ith surface. "Di" denotes an axial surface interval (lens center thickness or an air interval) between the ith surface and an (i+1)th surface. "Ni" denotes the index of refraction of a lens or the like starting with the ith surface at a d-line ($\lambda=587.6$ nm). "νi" denotes the Abbe number of the lens or the like starting with the ith surface at the d-line.

"ASP" in relation to the "surface number" denotes that the surface in question is an aspheric surface. "∞" in relation to the radius of curvature "Ri" means that the surface in question is a plane. "Variable" in relation to the axial surface interval "Di" denotes a variable interval.

"κ" denotes a conic constant. "A4," "A6," "A8," and "A10" denote aspheric coefficients of a 4th order, a 6th order, an 8th order, and a 10th order, respectively.

"f" denotes the focal length of the entire lens system. "Fno." denotes an F-number (full aperture F-value). "ω" denotes a half angle of view.

Incidentally, in each table showing aspheric coefficients in the following, "E-n" denotes an exponential representation having a base of 10, that is, "10 raised to a negative nth power." For example, "0.12345E-05" denotes "0.12345×(10 raised to a negative fifth power)."

Some of lens surfaces of the zoom lens used in each embodiment are formed as an aspheric surface. Letting "x" be a distance in the direction of an optical axis from the vertex of a lens surface, "y" be a height in a direction perpendicular to the optical axis, "c" be a paraxial curvature at the lens vertex, and "κ" is a conic constant, the aspheric shape is defined by the following Equation 1.

$$x = \frac{cy^2}{1+[1-(1+\kappa)c^2y^2]^{1/2}} + A4y^4 + A6y^6 + a8y^8 + A10y^{10} \quad \text{[Equation 1]}$$

Zoom lenses 1, 2, 3, and 4 in each embodiment to be shown below have a five-group configuration of a first to a fifth lens group G1 to G5.

First Embodiment

FIG. 1 shows a lens configuration of a zoom lens 1 in a first embodiment.

The variable power ratio of the zoom lens 1 is set at 8.74 times.

The zoom lens 1 is formed by arranging a first lens group G1 having positive refractive power, a second lens group G2 having negative refractive power, a third lens group G3 having positive refractive power, a fourth lens group G4 having positive refractive power, and a fifth lens group G5 having positive refractive power in order from an object side to an image side.

The first lens group G1 has a position fixed at all times. The second lens group G2 is made movable in a direction of an optical axis to vary power. The third lens group G3 has a position fixed at all times. The fourth lens group G4 is made movable in the direction of the optical axis to correct a focal position resulting from power variation and perform focusing.

The first lens group G1 is formed by arranging a lens L1 having a concave surface facing the image side, a lens L2 having a strong convex surface facing the image side, a cemented lens of a lens L3 of a biconcave shape and a lens L4 of a biconvex shape, and a lens L5 of a biconvex shape having a strong convex surface facing the object side in order from the object side to the image side. The lens L1 is formed as a compound aspheric lens.

The second lens group G2 is formed by arranging a lens L6 of a biconcave shape having a strong concave surface facing the image side and a cemented lens of a lens L7 of a biconcave shape and a lens L8 of a biconvex shape in order from the object side to the image side.

The third lens group G3 is formed by arranging a lens L9 of a biconvex shape and a cemented lens of a lens L10 of a biconvex shape and a lens L11 of a biconcave shape in order from the object side to the image side.

The fourth lens group G4 is formed by a lens L12 of a biconvex shape.

The fifth lens group G5 is formed by arranging a fixed group (front group) formed by a lens L13 of a biconcave shape having negative refractive power and having a position fixed at all times and a movable group (rear group) formed by a lens L14 of a biconvex shape having positive refractive power and made movable in the direction perpendicular to the optical axis in order from the object side to the image side.

Incidentally, the lens L13 as the front group may be a movable group, and the lens L14 as the rear group may be a fixed group.

A diaphragm S is disposed between the second lens group G2 and the third lens group G3.

A filter FL and an image pickup element having an image pickup surface IMG are arranged in order from the object side to the image side on the image side of the fifth lens group. A CCD (Charge Coupled Device) or a CMOS (Complementary Metal Oxide Semiconductor), for example, is used as the image pickup element. The filter FL is for example formed by an infrared cutoff filter or a low-pass filter.

The lens data of a first numerical example in which concrete numerical values are applied to the zoom lens 1 in the first embodiment is shown in Table 1.

TABLE 1

| SURFACE NUMBER | Ri | Di | Ni | vi |
|---|---|---|---|---|
| 1 | 181.068 | 0.226 | 1.911 | 35.3 |
| 2 | 8.400 | 0.023 | 1.534 | 41.7 |
| 3 (ASP) | 9.422 | 0.630 | | |
| 4 | −18.130 | 0.342 | 1.652 | 58.4 |

TABLE 1-continued

| SURFACE NUMBER | Ri | Di | Ni | vi |
|---|---|---|---|---|
| 5 | −13.618 | 0.034 | | |
| 6 | −66.829 | 0.213 | 1.946 | 18.0 |
| 7 | 11.207 | 0.703 | 1.835 | 42.7 |
| 8 | −11.782 | 0.034 | | |
| 9 | 5.850 | 0.711 | 1.883 | 40.8 |
| 10 | −34.273 | VARIABLE | | |
| 11 (ASP) | −22.634 | 0.158 | 1.851 | 40.1 |
| 12 (ASP) | 1.781 | 0.472 | | |
| 13 | −2.870 | 0.113 | 1.729 | 54.7 |
| 14 | 3.337 | 0.332 | 2.002 | 19.3 |
| 15 (ASP) | −22.634 | VARIABLE | | |
| 16 (DIAPHRAGM) | ∞ | 0.358 | | |
| 17 | 2.570 | 0.592 | 1.851 | 40.1 |
| 18 | −5.253 | 0.230 | | |
| 19 | 23.989 | 0.342 | 1.487 | 70.5 |
| 20 | −4.749 | 0.113 | 2.001 | 25.5 |
| 21 | 2.925 | VARIABLE | | |
| 22 (ASP) | 3.233 | 0.512 | 1.553 | 71.7 |
| 23 (ASP) | −3.908 | VARIABLE | | |
| 24 (ASP) | −22.634 | 0.158 | 1.689 | 31.2 |
| 25 (ASP) | 3.166 | 0.630 | | |
| 26 | 3.480 | 0.573 | 1.553 | 71.7 |
| 27 (ASP) | −2.981 | 0.837 | | |
| 28 | ∞ | 0.383 | 1.517 | 64.2 |
| 29 | ∞ | | | |

Formed as an aspheric surface in the zoom lens 1 are a surface nearest to the image side of the lens L1 in the first lens group G1 (the 3rd surface), both surfaces of the lens L6 in the second group G2 (the 11th surface and the 12th surface), a surface on the image side of the lens L8 in the second lens group G2 (the 15th surface), both surfaces of the lens L9 in the third lens group G3 (the 17th surface and the 18th surface), both surfaces of the lens L12 in the fourth lens group G4 (the 22th surface and the 23th surface), both surfaces of the lens L13 in the fifth lens group G5 (the 24th surface and the 25th surface), and a surface on the image side of the lens L14 in the fifth lens group G5 (the 27th surface). The aspheric coefficients A4, A6, A8, and A10 of the 4th order, the 6th order, the 8th order, and the 10th order of the aspheric surfaces in the first numerical example are shown in Table 2 together with the conic constant κ.

TABLE 2

| | κ | A4 | A6 | A8 | A10 |
|---|---|---|---|---|---|
| 3RD SURFACE | 0 | 1.015E−03 | 1.049E−05 | −8.895E−07 | 2.578E−07 |
| 11TH SURFACE | 0 | −5.189E−03 | −8.656E−03 | 3.275E−03 | 0.000E+00 |
| 12TH SURFACE | 0 | −1.253E−03 | −1.662E−02 | 3.966E−03 | −5.395E−03 |
| 15TH SURFACE | 0 | −8.694E−03 | 3.776E−03 | −6.014E−03 | 5.150E−03 |
| 17TH SURFACE | 0 | −1.007E−02 | 2.514E−04 | 5.201E−04 | −1.011E−03 |
| 18TH SURFACE | 0 | 4.240E−03 | 2.807E−03 | −1.933E−03 | −1.387E−04 |
| 22ND SURFACE | 0 | −1.667E−02 | 2.158E−03 | −1.790E−03 | 1.003E−03 |
| 23RD SUR- | 0 | −3.251E−03 | −1.023E−03 | −2.629E−03 | 2.566E−03 |

TABLE 2-continued

| | κ | A4 | A6 | A8 | A10 |
|---|---|---|---|---|---|
| FACE 24TH SURFACE | 0 | −2.040E−02 | 2.849E−02 | −2.646E−02 | 1.096E−02 |
| 25TH SURFACE | 0 | −2.822E−02 | 3.626E−02 | −2.788E−02 | 8.980E−03 |
| 27TH SURFACE | 0 | 3.597E−02 | −9.204E−03 | 2.958E−03 | 0.000E+00 |

In the zoom lens 1, a surface interval D10 between the first lens group G1 and the second lens group G2, a surface interval D15 between the second lens group G2 and the diaphragm S, a surface interval D21 between the third lens group G3 and the fourth lens group G4, and a surface interval D23 between the fourth lens group G4 and the fifth lens group G5 change in zooming between a wide-angle end state and a telephoto end state. Each surface interval in the wide-angle end state (f=1.000), an intermediate focal length state (f=2.958), and the telephoto end state (f=8.744) in the first numerical example is shown in Table 3 together with the focal length f, the F-number Fno., and the half angle of view ω.

TABLE 3

| f | 1.000 | 2.958 | 8.744 |
|---|---|---|---|
| Fno. | 1.850 | 2.797 | 3.499 |
| ω | 38.044 | 13.097 | 4.392 |
| D10 | 0.158 | 2.397 | 4.117 |
| D15 | 4.273 | 2.034 | 0.315 |
| D21 | 1.418 | 0.596 | 1.352 |
| D23 | 0.280 | 1.101 | 0.345 |

Figure 2:
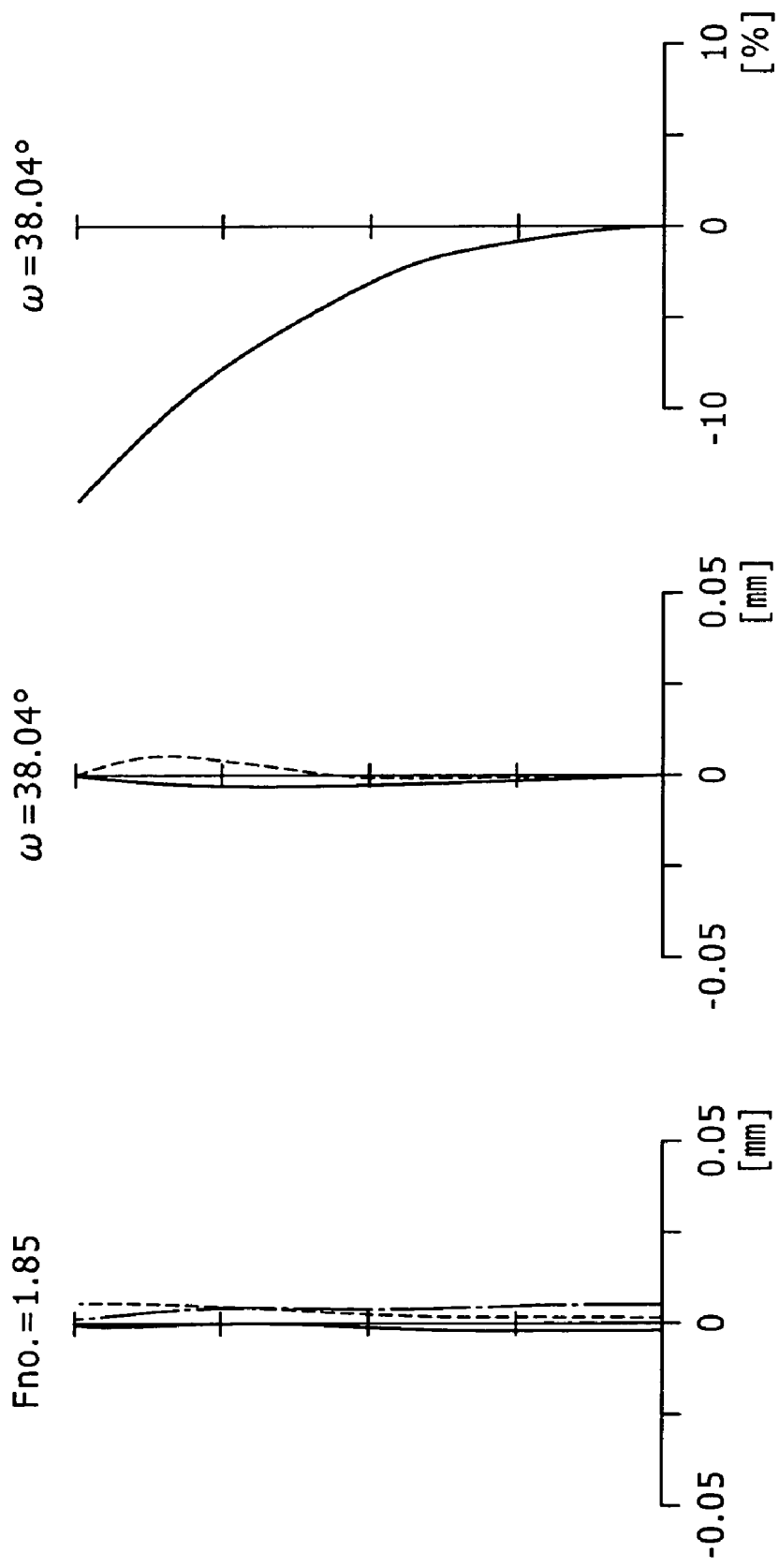
FIGS. 2A to 2C, in conjunction with FIGS. 3A to 3C and 4A to 4C, are diagrams of aberrations of a numerical example in which concrete numerical values are applied to the first embodiment, the present diagrams showing spherical aberration, astigmatism, and distortion aberration in a wide-angle end state.
Figure 3:
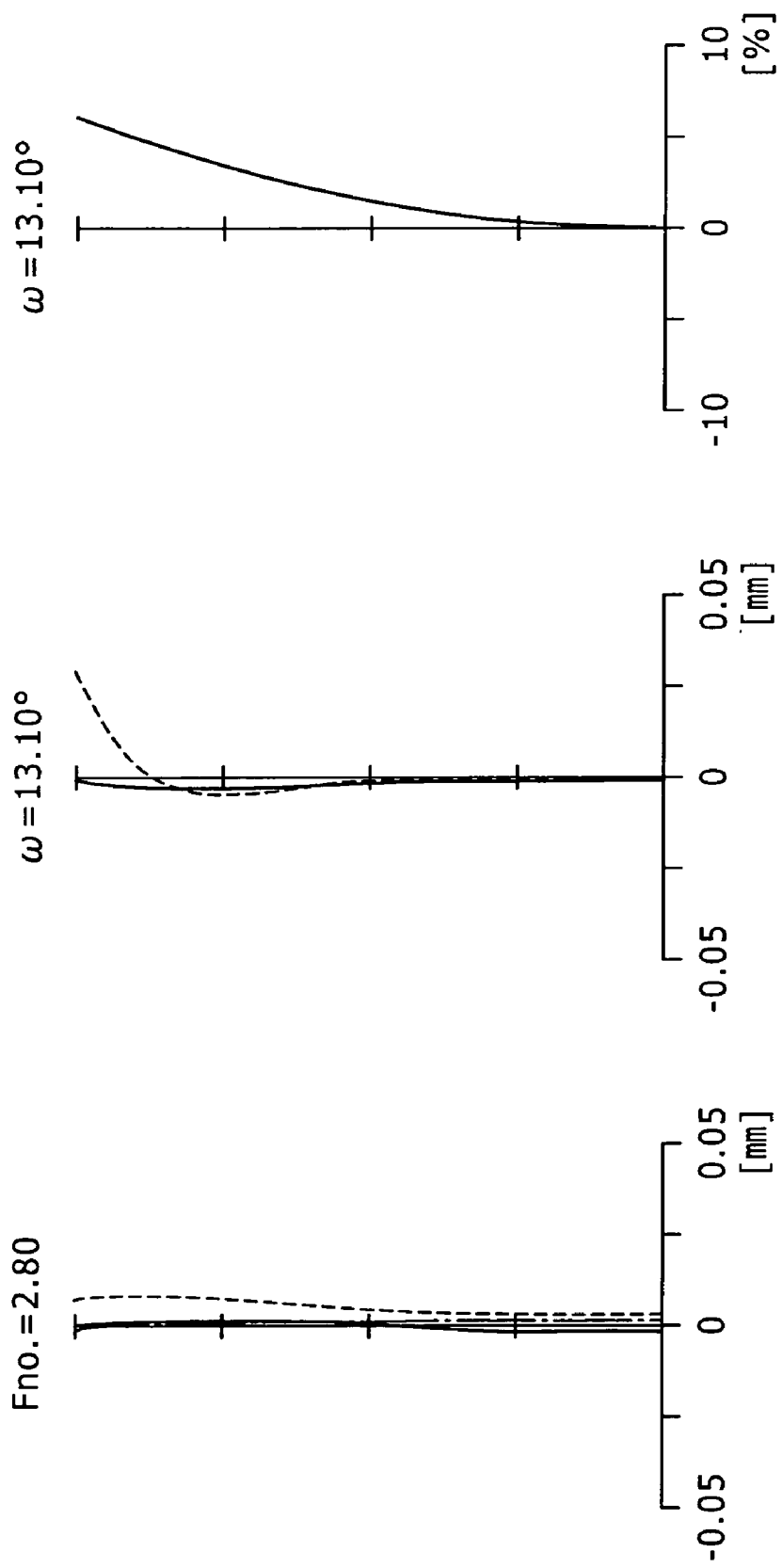
FIGS. 3A to 3C are diagrams showing spherical aberration, astigmatism, and distortion aberration in an intermediate focal length state.
Figure 4:
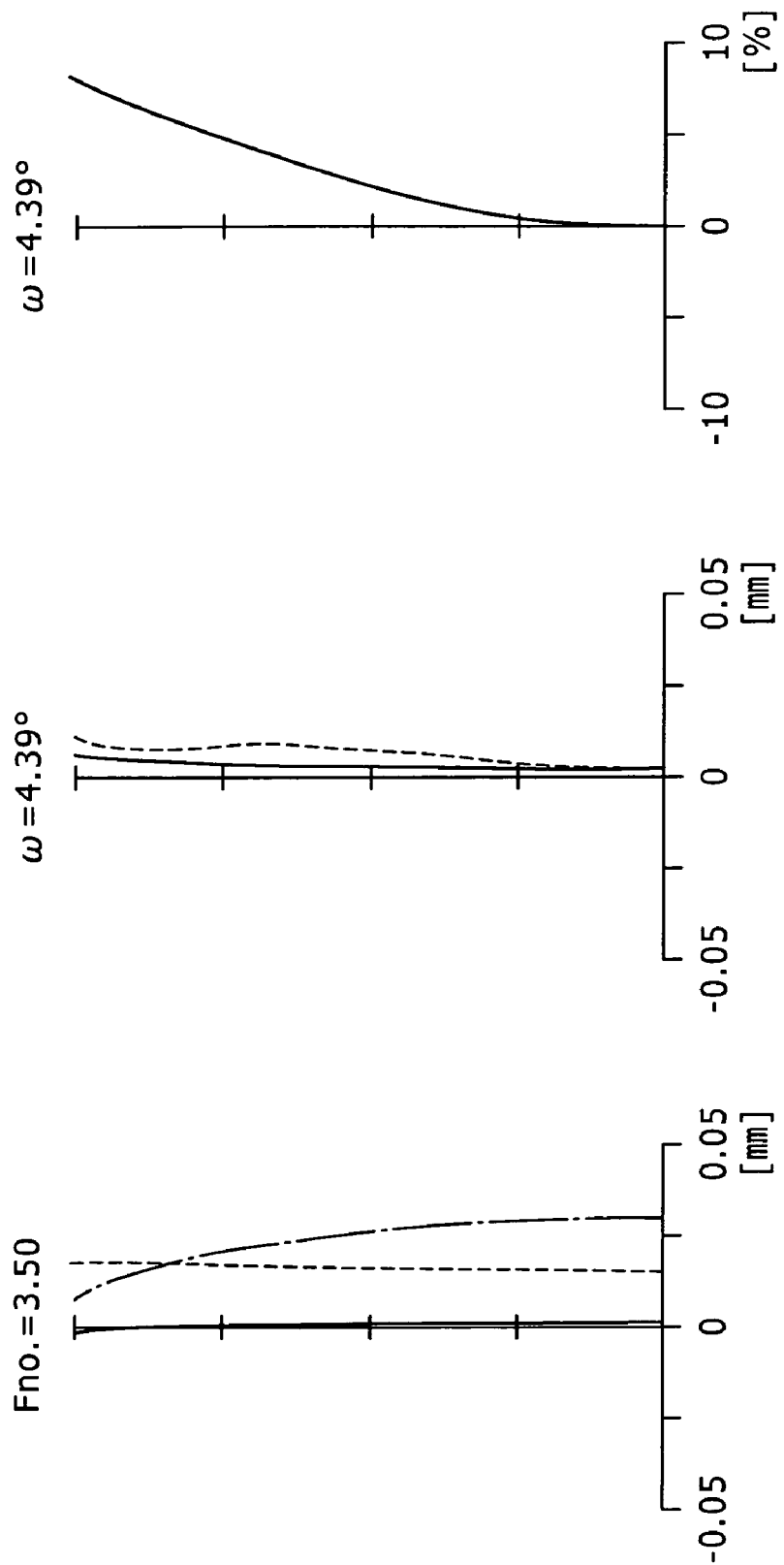
FIGS. 4A to 4C are diagrams showing spherical aberration, astigmatism, and distortion aberration in a telephoto end state.

FIGS. 2A to 4C are diagrams of various aberrations in an infinity focused state of the first numerical example. FIGS. 2A to 2C show spherical aberration, astigmatism, and distortion aberration in the wide-angle end state. FIGS. 3A to 3C show spherical aberration, astigmatism, and distortion aberration in the intermediate focal length state. FIGS. 4A to 4C show spherical aberration, astigmatism, and distortion aberration in the telephoto end state.

FIGS. 2A to 4C show values of spherical aberration at a d-line (wavelength of 587.6 nm) by a solid line, values of spherical aberration at a g-line (wavelength of 435.8 nm) by alternate long and short dashed lines, and values of spherical aberration at a C-line (wavelength of 656.3 nm) by a dotted line. FIGS. 2A to 4C show values of astigmatism on a sagittal image surface by a solid line, and show values of astigmatism on a meridional image surface by a dotted line.

It is clear from the aberration diagrams that the first numerical example excellently corrects various aberrations and has excellent image forming performance.

Second Embodiment

Figure 5:
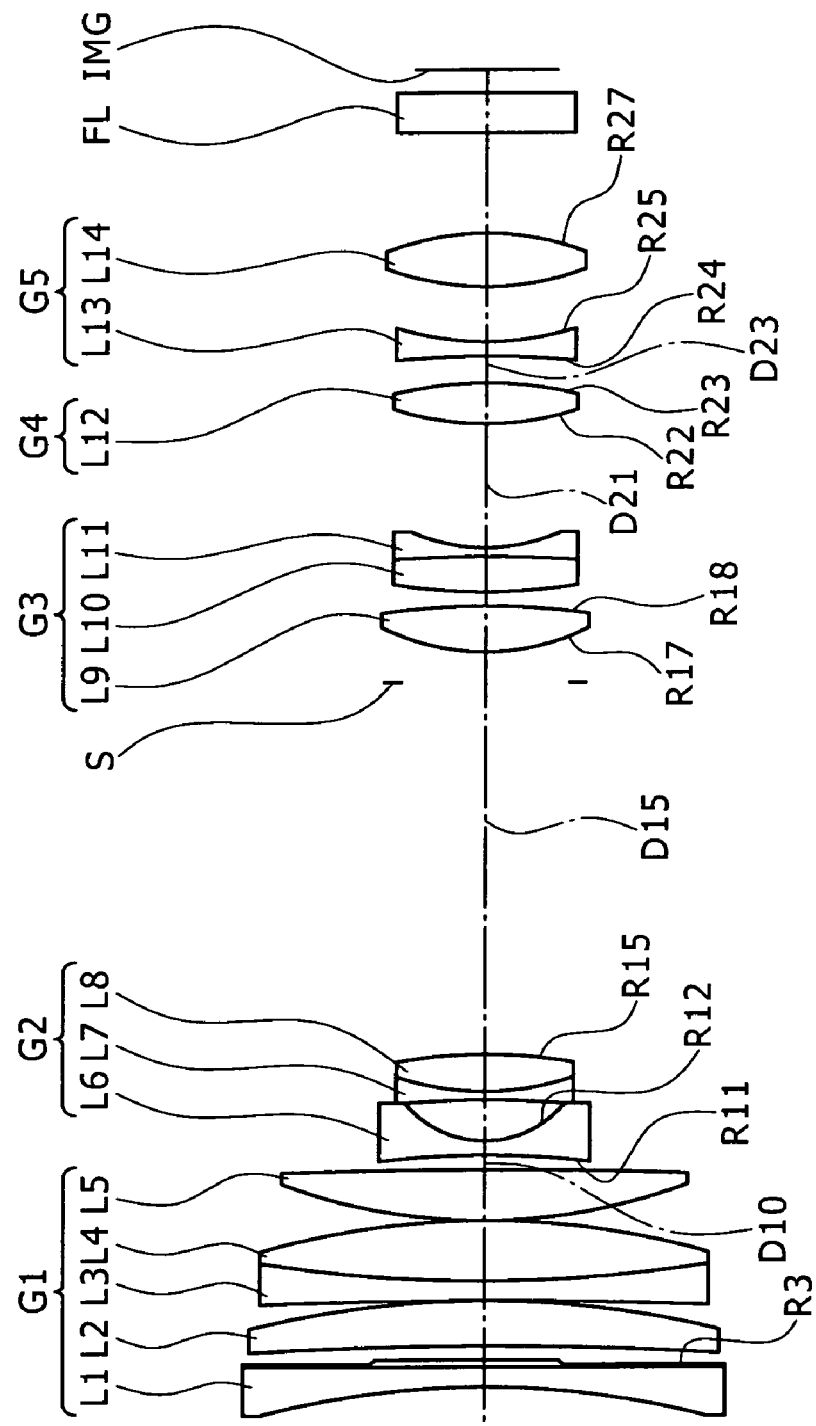
FIG. 5 is a diagram showing a lens configuration of a second embodiment of a zoom lens.

FIG. 5 shows a lens configuration of a zoom lens 2 according to a second embodiment.

The variable power ratio of the zoom lens 2 is set at 8.87 times.

The zoom lens 2 is formed by arranging a first lens group G1 having positive refractive power, a second lens group G2 having negative refractive power, a third lens group G3 having positive refractive power, a fourth lens group G4 having positive refractive power, and a fifth lens group G5 having positive refractive power in order from an object side to an image side.

The first lens group G1 has a position fixed at all times. The second lens group G2 is made movable in a direction of an optical axis to vary power. The third lens group G3 has a position fixed at all times. The fourth lens group G4 is made movable in the direction of the optical axis to correct a focal position resulting from power variation and perform focusing.

The first lens group G1 is formed by arranging a lens L1 having a concave surface facing the object side, a lens L2 having a strong convex surface facing the image side, a cemented lens of a lens L3 of a biconcave shape and a lens L4 of a biconvex shape, and a lens L5 of a biconvex shape having a strong convex surface facing the object side in order from the object side to the image side. The lens L1 is formed as a compound aspheric lens.

The second lens group G2 is formed by arranging a lens L6 of a biconcave shape having a strong concave surface facing the image side and a cemented lens of a lens L7 of a biconcave shape and a lens L8 of a biconvex shape in order from the object side to the image side.

The third lens group G3 is formed by arranging a lens L9 of a biconvex shape and a cemented lens of a biconvex shape and a lens L11 of a biconcave shape in order from the object side to the image side.

The fourth lens group G4 is formed by a lens L12 of a biconvex shape.

The fifth lens group G5 is formed by arranging a fixed group (front group) formed by a lens L13 of a biconcave shape having negative refractive power and having a position fixed at all times and a movable group (rear group) formed by a lens L14 of a biconvex shape having positive refractive power and made movable in the direction perpendicular to the optical axis in order from the object side to the image side.

Incidentally, the lens L13 as the front group may be a movable group, and the lens L14 as the rear group may be a fixed group.

A diaphragm S is disposed between the second lens group G2 and the third lens group G3.

A filter FL and an image pickup element having an image pickup surface IMG are arranged in order from the object side to the image side on the image side of the fifth lens group. A CCD or a CMOS, for example, is used as the image pickup element. The filter FL is for example formed by an infrared cutoff filter or a low-pass filter.

The lens data of a second numerical example in which concrete numerical values are applied to the zoom lens 2 in the second embodiment is shown in Table 4.

TABLE 4

| SURFACE NUMBER | Ri | Di | Ni | vi |
|---|---|---|---|---|
| 1 | −9.107 | 0.226 | 1.911 | 35.3 |
| 2 | −1241.481 | 0.041 | 1.534 | 41.7 |
| 3 (ASP) | −54.426 | 0.136 | | |
| 4 | −45.147 | 0.536 | 1.652 | 58.4 |
| 5 | −10.936 | 0.034 | | |
| 6 | −46.263 | 0.213 | 1.946 | 18.0 |
| 7 | 14.543 | 0.642 | 1.835 | 42.7 |
| 8 | −11.529 | 0.034 | | |
| 9 | 6.589 | 0.615 | 1.883 | 40.8 |
| 10 | −63.651 | VARIABLE | | |
| 11 (ASP) | −59.840 | 0.158 | 1.851 | 40.1 |
| 12 (ASP) | 1.221 | 0.472 | | |
| 13 | −7.292 | 0.113 | 1.729 | 54.7 |
| 14 | 3.555 | 0.416 | 2.002 | 19.3 |
| 15 (ASP) | −22.621 | VARIABLE | | |
| 16 (DIAPHRAGM) | ∞ | 0.357 | | |

TABLE 4-continued

| SURFACE NUMBER | Ri | Di | Ni | vi |
|---|---|---|---|---|
| 17 (ASP) | 2.481 | 0.574 | 1.851 | 40.1 |
| 18 (ASP) | −6.512 | 0.116 | | |
| 19 | 5.605 | 0.400 | 1.487 | 70.5 |
| 20 | −10.144 | 0.113 | 2.001 | 25.5 |
| 21 | 2.216 | VARIABLE | | |
| 22 (ASP) | 2.908 | 0.502 | 1.553 | 71.7 |
| 23 (ASP) | −5.136 | VARIABLE | | |
| 24 (ASP) | −22.373 | 0.157 | 1.689 | 31.2 |
| 25 (ASP) | 3.273 | 0.671 | | |
| 26 | 3.536 | 0.568 | 1.553 | 71.7 |
| 27(ASP) | −2.867 | 0.828 | | |
| 28 | ∞ | 0.382 | 1.517 | 64.2 |
| 29 | ∞ | | | |

Formed as an aspheric surface in the zoom lens 2 are a surface nearest to the image side of the lens L1 in the first lens group G1 (the 3rd surface), both surfaces of the lens L6 in the second group G2 (the 11th surface and the 12th surface), a surface on the image side of the lens L8 in the second lens group G2 (the 15th surface), both surfaces of the lens L9 in the third lens group G3 (the 17th surface and the 18th surface), both surfaces of the lens L12 in the fourth lens group G4 (the 22th surface and the 23th surface), both surfaces of the lens L13 in the fifth lens group G5 (the 24th surface and the 25th surface), and a surface on the image side of the lens L14 in the fifth lens group G5 (the 27th surface). The aspheric coefficients A4, A6, A8, and A10 of the 4th order, the 6th order, the 8th order, and the 10th order of the aspheric surfaces in the second numerical example are shown in Table 5 together with the conic constant κ.

TABLE 5

| | κ | A4 | A6 | A8 | A10 |
|---|---|---|---|---|---|
| 3RD SURFACE | 0 | 9.377E−04 | 7.920E−06 | −1.269E−06 | 3.933E−08 |
| 11TH SURFACE | 0 | −2.830E−02 | 1.276E−02 | −2.609E−03 | 0.000E+00 |
| 12TH SURFACE | 0 | −2.674E−01 | −8.664E−03 | 3.767E−03 | 3.707E−04 |
| 15TH SURFACE | 0 | −2.758E−02 | −5.773E−03 | 5.094E−04 | −6.066E−03 |
| 17TH SURFACE | 0 | −7.186E−03 | −2.609E−04 | 4.758E−04 | 3.566E−04 |
| 18TH SURFACE | 0 | 8.266E−03 | 7.832E−05 | 5.501E−04 | 3.223E−04 |
| 22ND SURFACE | 0 | −8.014E−03 | −3.775E−03 | 2.231E−03 | 1.289E−03 |
| 23RD SURFACE | 0 | −1.165E−03 | −4.352E−03 | 1.613E−03 | 2.131E−03 |
| 24TH SURFACE | 0 | −2.661E−02 | 4.144E−02 | −3.309E−02 | 1.092E−02 |
| 25TH SURFACE | 0 | −2.981E−02 | 4.257E−02 | −3.220E−02 | 9.780E−03 |
| 27TH SURFACE | 0 | 3.401E−02 | −5.120E−03 | 1.037E−03 | 0.000E+00 |

In the zoom lens 2, a surface interval D10 between the first lens group G1 and the second lens group G2, a surface interval D15 between the second lens group G2 and the diaphragm S, a surface interval D21 between the third lens group G3 and the fourth lens group G4, and a surface interval D23 between the fourth lens group G4 and the fifth lens group G5 change in zooming between a wide-angle end state and a telephoto end state. Each surface interval in the wide-angle end state (f=1.000), an intermediate focal length state (f=2.979), and the telephoto end state (f=8.873) in the second numerical example is shown in Table 6 together with the focal length f, the F-number Fno., and the half angle of view ω.

TABLE 6

| f | 1.000 | 2.979 | 8.873 |
|---|---|---|---|
| Fno. | 1.850 | 2.826 | 3.499 |
| ω | 38.138 | 13.153 | 4.401 |
| D10 | 0.158 | 2.408 | 4.115 |
| D15 | 4.271 | 2.022 | 0.314 |
| D21 | 1.434 | 0.601 | 1.368 |
| D23 | 0.274 | 1.106 | 0.340 |

Figure 6:
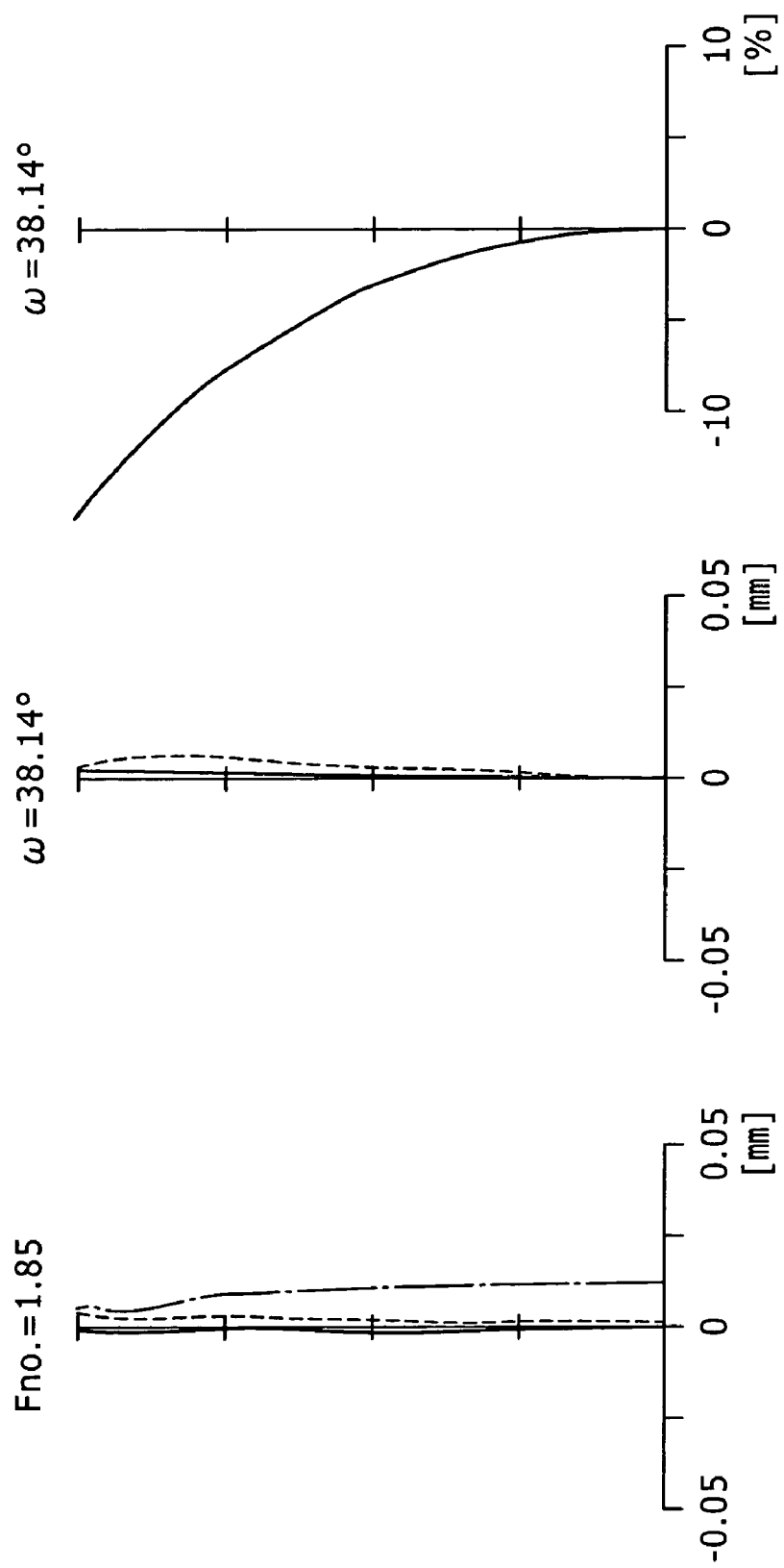
FIGS. 6A to 6C, in conjunction with FIGS. 7A to 7C and 8A to 8C, are diagrams of aberrations of a numerical example in which concrete numerical values are applied to the second embodiment, the present diagrams showing spherical aberration, astigmatism, and distortion aberration in a wide-angle end state.
Figure 7:
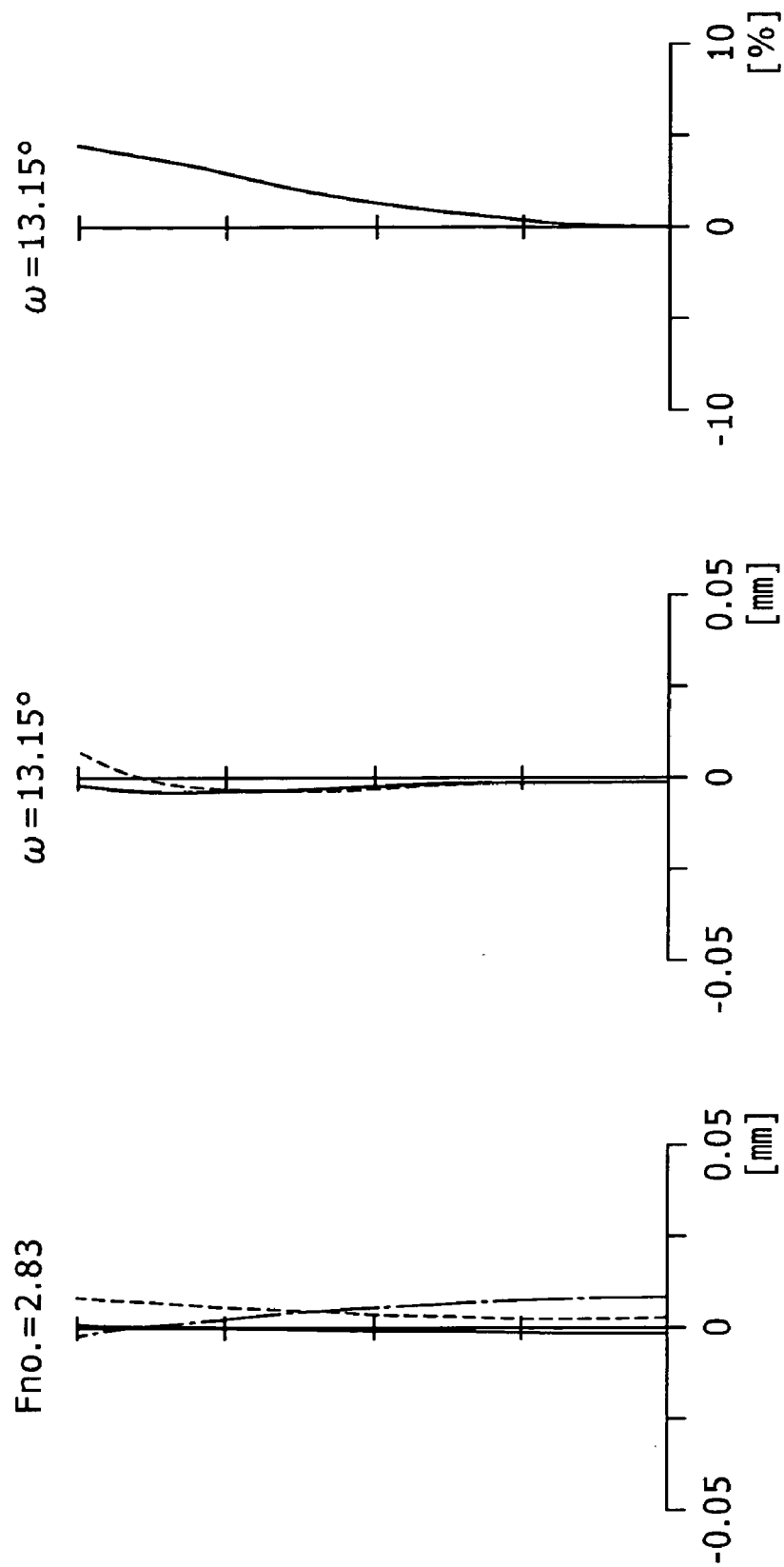
FIGS. 7A to 7C are diagrams showing spherical aberration, astigmatism, and distortion aberration in an intermediate focal length state.
Figure 8:
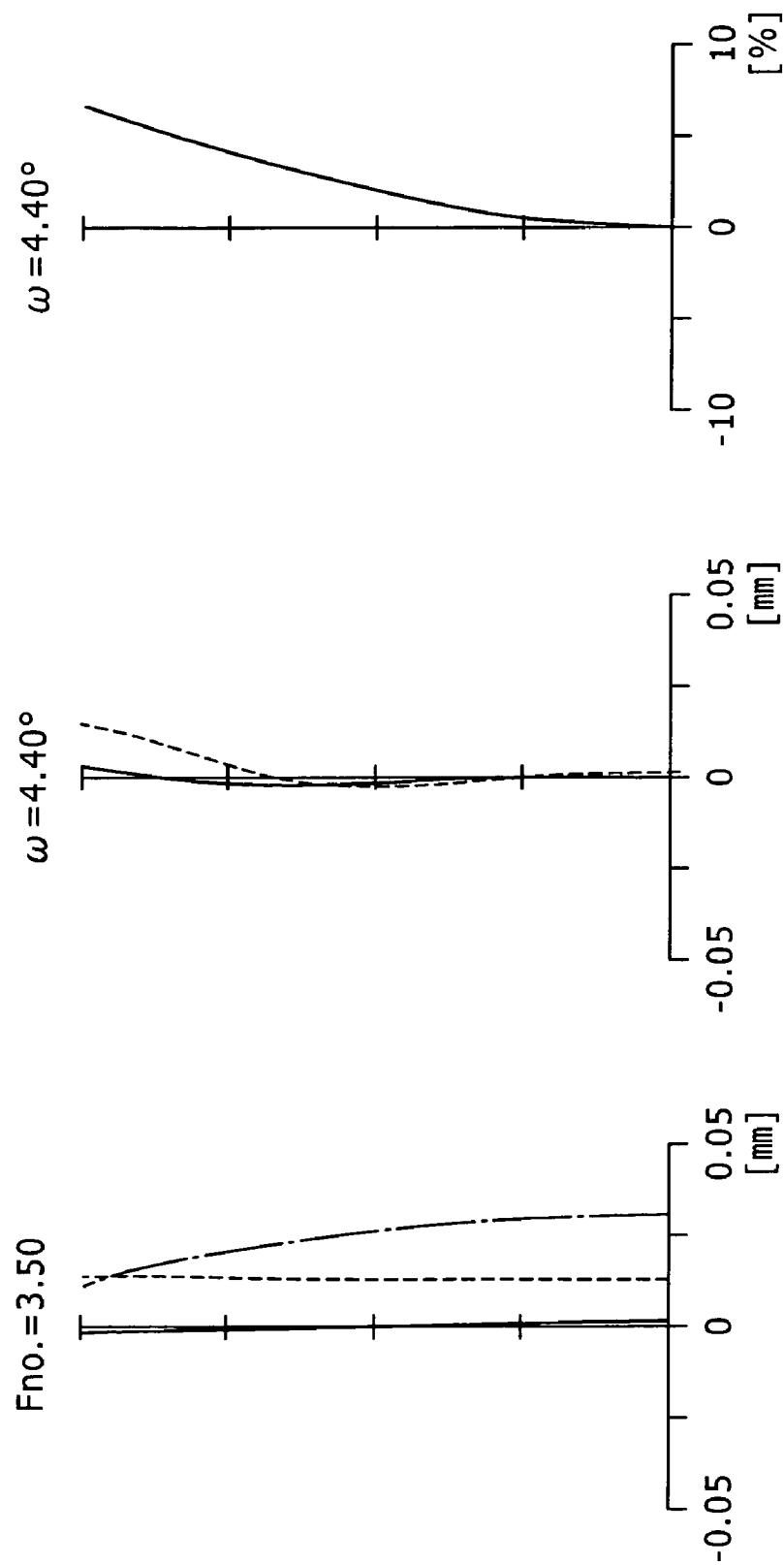
FIGS. 8A to 8C are diagrams showing spherical aberration, astigmatism, and distortion aberration in a telephoto end state.

FIGS. 6A to 8C are diagrams of various aberrations in an infinity focused state of the second numerical example. FIGS. 6A to 6C show spherical aberration, astigmatism, and distortion aberration in the wide-angle end state. FIGS. 7A to 7C show spherical aberration, astigmatism, and distortion aberration in the intermediate focal length state. FIGS. 8A to 8C show spherical aberration, astigmatism, and distortion aberration in the telephoto end state.

FIGS. 6A to 8C show values of spherical aberration at a d-line (wavelength of 587.6 nm) by a solid line, values of spherical aberration at a g-line (wavelength of 435.8 nm) by alternate long and short dashed lines, and values of spherical aberration at a C-line (wavelength of 656.3 nm) by a dotted line. FIGS. 6A to 8C show values of astigmatism on a sagittal image surface by a solid line, and show values of astigmatism on a meridional image surface by a dotted line.

It is clear from the aberration diagrams that the second numerical example excellently corrects various aberrations and has excellent image forming performance.

Third Embodiment

Figure 9:
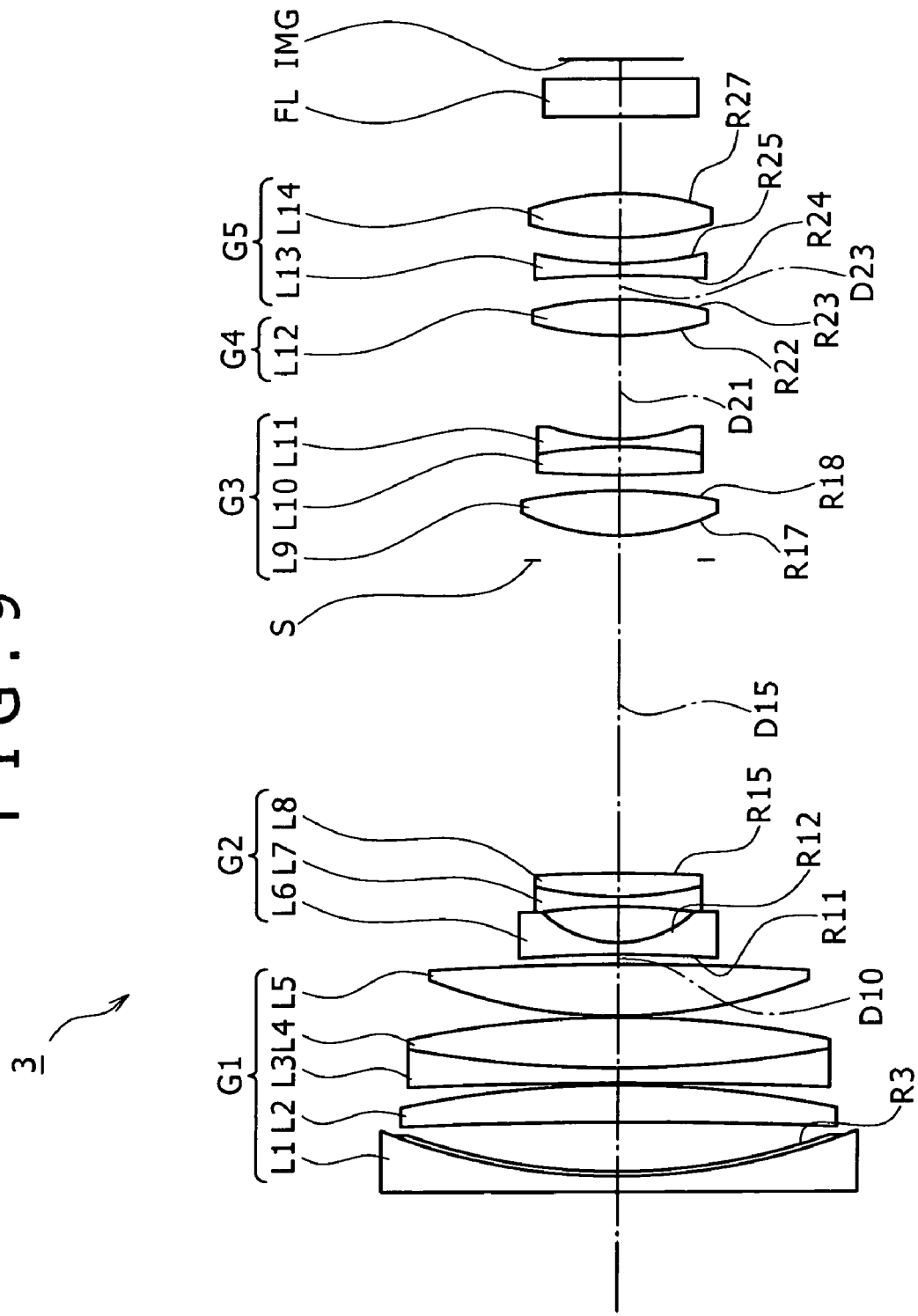
FIG. 9 is a diagram showing a lens configuration of a third embodiment of a zoom lens.

FIG. 9 shows a lens configuration of a zoom lens 3 according to a third embodiment.

The variable power ratio of the zoom lens 3 is set at 8.71 times.

The zoom lens 3 is formed by arranging a first lens group G1 having positive refractive power, a second lens group G2 having negative refractive power, a third lens group G3 having positive refractive power, a fourth lens group G4 having positive refractive power, and a fifth lens group G5 having positive refractive power in order from an object side to an image side.

The first lens group G1 has a position fixed at all times. The second lens group G2 is made movable in a direction of an optical axis to vary power. The third lens group G3 has a position fixed at all times. The fourth lens group G4 is made movable in the direction of the optical axis to correct a focal position resulting from power variation and perform focusing.

The first lens group G1 is formed by arranging a lens L1 having a concave surface facing the image side, a lens L2 having a strong convex surface facing the image side, a cemented lens of a lens L3 of a biconcave shape and a lens L4 of a biconvex shape, and a lens L5 of a biconvex shape having a strong convex surface facing the object side in order from the object side to the image side. The lens L1 is formed as a compound aspheric lens.

The second lens group G2 is formed by arranging a lens L6 of a biconcave shape having a strong concave surface facing the image side and a cemented lens of a lens L7 of a biconcave shape and a lens L8 of a biconvex shape in order from the object side to the image side.

The third lens group G3 is formed by arranging a lens L9 of a biconvex shape and a cemented lens of a lens L10 of a biconvex shape and a lens L11 of a biconcave shape in order from the object side to the image side.

The fourth lens group G4 is formed by a lens L12 of a biconvex shape.

The fifth lens group G5 is formed by arranging a fixed group (front group) formed by a lens L13 of a biconcave shape having negative refractive power and having a position fixed at all times and a movable group (rear group) formed by a lens L14 of a biconvex shape having positive refractive power and made movable in the direction perpendicular to the optical axis in order from the object side to the image side.

Incidentally, the lens L13 as the front group may be a movable group, and the lens L14 as the rear group may be a fixed group.

A diaphragm S is disposed between the second lens group G2 and the third lens group G3.

A filter FL and an image pickup element having an image pickup surface IMG are arranged in order from the object side to the image side on the image side of the fifth lens group. A CCD or a CMOS, for example, is used as the image pickup element. The filter FL is for example formed by an infrared cutoff filter or a low-pass filter.

The lens data of a third numerical example in which concrete numerical values are applied to the zoom lens 3 in the third embodiment is shown in Table 7.

TABLE 7

| SURFACE NUMBER | Ri | Di | Ni | vi |
|---|---|---|---|---|
| 1 | 194.489 | 0.243 | 1.911 | 35.3 |
| 2 | 7.045 | 0.024 | 1.534 | 41.7 |
| 3 (ASP) | 7.478 | 0.795 | | |
| 4 | −31.527 | 0.517 | 1.652 | 58.4 |
| 5 | −12.095 | 0.036 | | |
| 6 | −39.795 | 0.229 | 1.946 | 18.0 |
| 7 | 14.102 | 0.718 | 1.835 | 42.7 |
| 8 | −12.317 | 0.036 | | |
| 9 | 6.118 | 0.795 | 1.883 | 40.8 |
| 10 | −31.134 | VARIABLE | | |
| 11 (ASP) | −24.311 | 0.170 | 1.851 | 40.1 |
| 12 (ASP) | 1.747 | 0.504 | | |
| 13 | −3.621 | 0.122 | 1.729 | 54.7 |
| 14 | 3.545 | 0.371 | 2.002 | 19.3 |
| 15 (ASP) | −24.311 | VARIABLE | | |
| 16 (DIAPHRAGM) | ∞ | 0.384 | | |
| 17 (ASP) | 2.498 | 0.665 | 1.851 | 40.1 |
| 18 (ASP) | −5.841 | 0.201 | | |
| 19 | 12.509 | 0.411 | 1.487 | 70.5 |
| 20 | −4.858 | 0.122 | 2.001 | 25.5 |
| 21 | 2.554 | VARIABLE | | |
| 22 (ASP) | 3.214 | 0.570 | 1.553 | 71.7 |
| 23 (ASP) | −4.167 | VARIABLE | | |
| 24 (ASP) | −24.311 | 0.170 | 1.689 | 31.2 |
| 25 (ASP) | 3.253 | 0.425 | | |
| 26 | 4.116 | 0.617 | 1.553 | 71.7 |
| 27 (ASP) | −2.796 | 0.851 | | |
| 28 | ∞ | 0.411 | 1.517 | 64.2 |
| 29 | ∞ | | | |

Formed as an aspheric surface in the zoom lens 3 are a surface nearest to the image side of the lens L1 in the first lens group G1 (the 3rd surface), both surfaces of the lens L6 in the second group G2 (the 11th surface and the 12th surface), a surface on the image side of the lens L8 in the second lens group G2 (the 15th surface), both surfaces of the lens L9 in the third lens group G3 (the 17th surface and the 18th surface), both surfaces of the lens L12 in the fourth lens group G4 (the 22th surface and the 23th surface), both surfaces of the lens L13 in the fifth lens group G5 (the 24th surface and the 25th surface), and a surface on the image side of the lens L14 in the fifth lens group G5 (the 27th surface). The aspheric coefficients A4, A6, A8, and A10 of the 4th order, the 6th order, the 8th order, and the 10th order of the aspheric surfaces in the third numerical example are shown in Table 8 together with the conic constant κ.

TABLE 8

| | κ | A4 | A6 | A8 | A10 |
|---|---|---|---|---|---|
| 3RD SURFACE | 0 | 6.117E−04 | −8.962E−06 | 1.435E−06 | 5.654E−08 |
| 11TH SURFACE | 0 | −8.954E−03 | −3.195E−03 | 1.472E−03 | 0.000E+00 |
| 12TH SURFACE | 0 | −5.558E−03 | −3.903E−03 | −2.516E−03 | 2.453E−03 |
| 15TH SURFACE | 0 | −1.090E−02 | 3.351E−03 | −7.429E−03 | 3.426E−03 |
| 17TH SURFACE | 0 | −7.870E−03 | −2.414E−04 | 4.216E−04 | −6.742E−04 |
| 18TH SURFACE | 0 | 6.456E−03 | 1.184E−03 | −1.195E−03 | −1.109E−04 |
| 22ND SURFACE | 0 | −1.059E−02 | −4.513E−03 | 2.039E−03 | 2.522E−04 |
| 23RD SURFACE | 0 | −3.188E−04 | −6.848E−03 | 1.594E−03 | 1.348E−03 |
| 24TH SURFACE | 0 | −2.745E−02 | 3.436E−02 | −2.820E−02 | 1.036E−02 |
| 25TH SURFACE | 0 | −3.419E−02 | 3.920E−02 | −2.938E−02 | 9.180E−03 |
| 27TH SURFACE | 0 | 3.497E−02 | −5.113E−03 | 1.600E−03 | 0.000E+00 |

In the zoom lens 3, a surface interval D10 between the first lens group G1 and the second lens group G2, a surface interval D15 between the second lens group G2 and the diaphragm S, a surface interval D21 between the third lens group G3 and the fourth lens group G4, and a surface interval D23 between the fourth lens group G4 and the fifth lens group G5 change in zooming between a wide-angle end state and a telephoto end state. Each surface interval in the wide-angle end state (f=1.000), an intermediate focal length state (f=2.952), and the telephoto end state (f=8.712) in the third numerical example is shown in Table 9 together with the focal length f, the F-number Fno., and the half angle of view ω.

TABLE 9

| f | 1.000 | 2.952 | 8.712 |
|---|---|---|---|
| Fno. | 1.850 | 2.806 | 3.500 |
| ω | 39.778 | 13.751 | 4.682 |

TABLE 9-continued

| D10 | 0.170 | 2.565 | 4.418 |
|---|---|---|---|
| D15 | 4.586 | 2.191 | 0.338 |
| D21 | 1.500 | 0.625 | 1.427 |
| D23 | 0.305 | 1.179 | 0.378 |

Figures 10A, 10B, 10C:
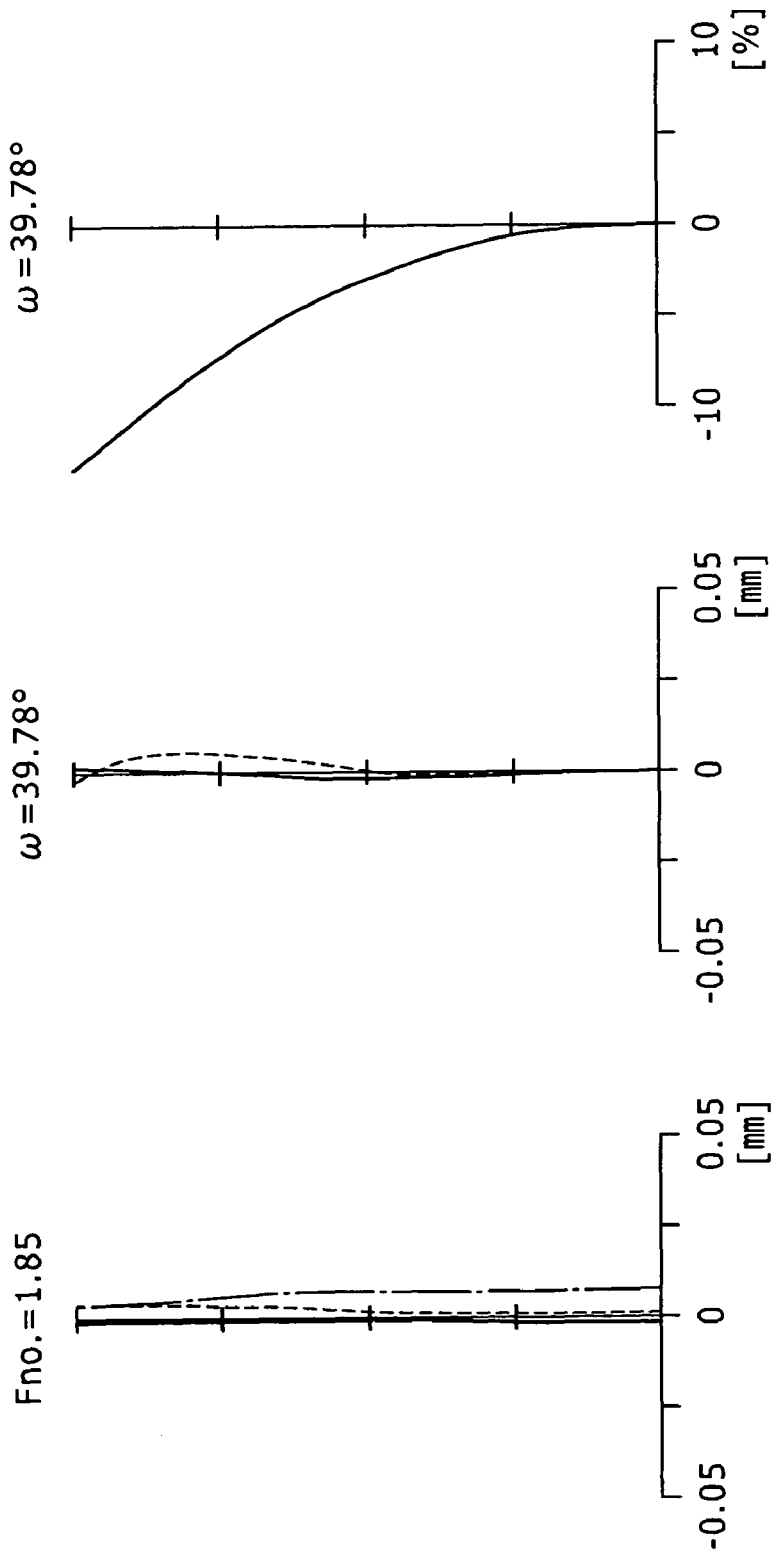
FIGS. 10A to 10C, in conjunction with FIGS. 11A to 11C and 12A to 12C, are diagrams of aberrations of a numerical example in which concrete numerical values are applied to the third embodiment, the present diagrams showing spherical aberration, astigmatism, and distortion aberration in a wide-angle end state.

FIGS. 10A to 12C are diagrams of various aberrations in an infinity focused state of the third numerical example. FIGS. 10A to 10C show spherical aberration, astigmatism, and distortion aberration in the wide-angle end state. FIGS. 11A to 11C show spherical aberration, astigmatism, and distortion aberration in the intermediate focal length state. FIGS. 12A to 12C show spherical aberration, astigmatism, and distortion aberration in the telephoto end state.

FIGS. 10A to 12C show values of spherical aberration at a d-line (wavelength of 587.6 nm) by a solid line, values of spherical aberration at a g-line (wavelength of 435.8 nm) by alternate long and short dashed lines, and values of spherical aberration at a C-line (wavelength of 656.3 nm) by a dotted line. FIGS. 10A to 12C show values of astigmatism on a sagittal image surface by a solid line, and show values of astigmatism on a meridional image surface by a dotted line.

It is clear from the aberration diagrams that the third numerical example excellently corrects various aberrations and has excellent image forming performance.

Fourth Embodiment

Figure 13:
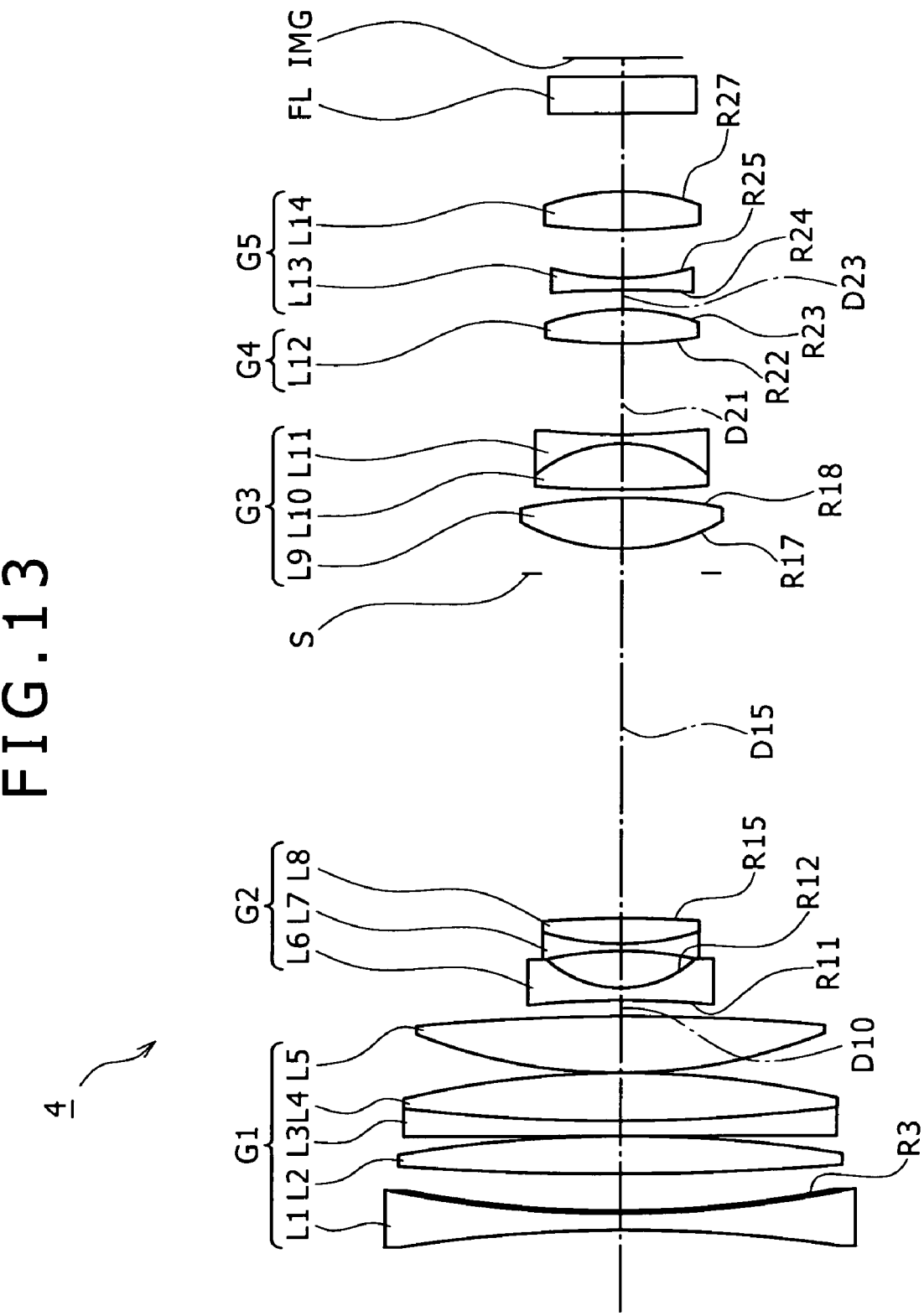
FIG. 13 is a diagram showing a lens configuration of a fourth embodiment of a zoom lens.

FIG. 13 shows a lens configuration of a zoom lens 4 according to a fourth embodiment.

The variable power ratio of the zoom lens 4 is set at 12.09 times.

The zoom lens 4 is formed by arranging a first lens group G1 having positive refractive power, a second lens group G2 having negative refractive power, a third lens group G3 having positive refractive power, a fourth lens group G4 having positive refractive power, and a fifth lens group G5 having positive refractive power in order from an object side to an image side.

The first lens group G1 has a position fixed at all times. The second lens group G2 is made movable in a direction of an optical axis to vary power. The third lens group G3 has a position fixed at all times. The fourth lens group G4 is made movable in the direction of the optical axis to correct a focal position resulting from power variation and perform focusing.

The first lens group G1 is formed by arranging a lens L1 having a concave surface facing the image side, a lens L2 having a strong convex surface facing the image side, a cemented lens of a lens L3 of a biconcave shape and a lens L4 of a biconvex shape, and a lens L5 of a biconvex shape having a strong convex surface facing the object side in order from the object side to the image side. The lens L1 is formed as a compound aspheric lens.

The second lens group G2 is formed by arranging a lens L6 of a biconcave shape, having a strong concave surface facing the image side and a cemented lens of a lens L7 of a biconcave shape and a lens L8 of a biconvex shape in order from the object side to the image side.

The third lens group G3 is formed by arranging a lens L9 of a biconvex shape and a cemented lens of a lens L10 of a biconvex shape and a lens L11 of a biconcave shape in order from the object side to the image side.

The fourth lens group G4 is formed by a lens L12 of a biconvex shape.

The fifth lens group G5 is formed by arranging a fixed group (front group) formed by a lens L13 of a biconcave shape having negative refractive power and having a position fixed at all times and a movable group (rear group) formed by a lens L14 of a biconvex shape having positive refractive power and made movable in the direction perpendicular to the optical axis in order from the object side to the image side.

Incidentally, the lens L13 as the front group may be a movable group, and the lens L14 as the rear group may be a fixed group.

A diaphragm S is disposed between the second lens group G2 and the third lens group G3.

A filter FL and an image pickup element having an image pickup surface IMG are arranged in order from the object side to the image side on the image side of the fifth lens group. A CCD or a CMOS, for example, is used as the image pickup element. The filter FL is for example formed by an infrared cutoff filter or a low-pass filter.

The lens data of a fourth numerical example in which concrete numerical values are applied to the zoom lens 4 in the fourth embodiment is shown in Table 10.

TABLE 10

| SURFACE NUMBER | Ri | Di | Ni | vi |
|---|---|---|---|---|
| 1 | −19.105 | 0.241 | 1.911 | 35.3 |
| 2 | 13.578 | 0.048 | 1.534 | 41.7 |
| 3 (ASP) | 18.877 | 0.580 | | |
| 4 | 58.678 | 0.543 | 1.618 | 63.4 |
| 5 | −16.677 | 0.036 | | |
| 6 | −95.221 | 0.217 | 1.946 | 18.0 |
| 7 | 19.677 | 0.687 | 1.883 | 49.6 |
| 8 | −14.545 | 0.036 | | |
| 9 | 7.460 | 0.891 | 1.883 | 42.7 |
| 10 | −23.706 | VARIABLE | | |
| 11 (ASP) | −9.405 | 0.157 | 1.851 | 40.1 |
| 12 (ASP) | 1.631 | 0.564 | | |
| 13 | −4.629 | 0.108 | 1.755 | 52.3 |
| 14 | 3.332 | 0.400 | 2.002 | 19.3 |
| 15 (ASP) | −24.103 | VARIABLE | | |
| 16 (DIAPHRAGM) | ∞ | 0.381 | | |
| 17 (ASP) | 3.353 | 0.747 | 1.851 | 40.1 |
| 18 (ASP) | −5.664 | 0.112 | | |
| 19 | 12.218 | 0.683 | 1.517 | 64.2 |
| 20 | −2.118 | 0.121 | 2.001 | 25.5 |
| 21 | 12.507 | VARIABLE | | |
| 22 (ASP) | 5.024 | 0.552 | 1.553 | 71.7 |
| 23 (ASP) | −3.089 | VARIABLE | | |
| 24 (ASP) | −24.103 | 0.169 | 1.801 | 45.5 |
| 25 (ASP) | 3.204 | 0.728 | | |
| 26 | 8.694 | 0.590 | 1.553 | 71.7 |
| 27 (ASP) | −2.452 | 0.844 | | |
| 28 | ∞ | 0.407 | 1.517 | 64.2 |
| 29 | ∞ | | | |

Formed as an aspheric surface in the zoom lens 4 are a surface nearest to the image side of the lens L1 in the first lens group G1 (the 3rd surface), both surfaces of the lens L6 in the second group G2 (the 11th surface and the 12th surface), a surface on the image side of the lens L8 in the second lens group G2 (the 15th surface), both surfaces of the lens L9 in the third lens group G3 (the 17th surface and the 18th surface), both surfaces of the lens L12 in the fourth lens group G4 (the 22th surface and the 23th surface), both surfaces of the lens L13 in the fifth lens group G5 (the 24th surface and the 25th surface), and a surface on the image side of the lens L14 in the fifth lens group G5 (the 27th surface). The aspheric coefficients A4, A6, A8, and A10 of the 4th order, the 6th order, the 8th order, and the 10th order of the aspheric surfaces in the fourth numerical example are shown in Table 11 together with the conic constant κ.

TABLE 11

| | κ | A4 | A6 | A8 | A10 |
|---|---|---|---|---|---|
| 3RD SURFACE | 0 | 9.557E−04 | 1.252E−05 | −8.360E−07 | 3.571E−08 |
| 11TH SURFACE | 0 | 3.058E−02 | −1.907E−02 | 3.033E−03 | 0.000E+00 |
| 12TH SURFACE | 0 | 3.525E−02 | −4.397E−03 | 1.693E−03 | −1.821E−02 |
| 15TH SURFACE | 0 | −1.151E−02 | −5.257E−03 | −4.506E−03 | 3.330E−03 |
| 17TH SURFACE | 0 | 1.364E−03 | −1.595E−04 | 3.982E−04 | 2.753E−04 |
| 18TH SURFACE | 0 | 3.974E−03 | −6.934E−04 | 7.657E−04 | 1.821E−04 |
| 22ND SURFACE | 0 | −1.947E−02 | −1.023E−02 | −4.231E−03 | −7.283E−04 |
| 23RD SURFACE | 0 | −3.212E−03 | −1.176E−02 | −1.693E−03 | −1.122E−03 |
| 24TH SURFACE | 0 | −4.325E−02 | 8.905E−02 | −5.562E−02 | 8.290E−02 |
| 25TH SURFACE | 0 | −5.227E−02 | 8.962E−02 | −4.231E−02 | −1.871E−03 |
| 27TH SURFACE | 0 | 4.299E−02 | −8.346E−03 | 1.904E−03 | 0.000E+00 |

In the zoom lens 4, a surface interval D10 between the first lens group G1 and the second lens group G2, a surface interval D15 between the second lens group G2 and the diaphragm S, a surface interval D21 between the third lens group G3 and the fourth lens group G4, and a surface interval D23 between the fourth lens group G4 and the fifth lens group G5 change in zooming between a wide-angle end state and a telephoto end state. Each surface interval in the wide-angle end state (f=1.000), an intermediate focal length state (f=3.477), and the telephoto end state (f=12.088) in the fourth numerical example is shown in Table 12 together with the focal length f, the F-number Fno., and the half angle of view ω.

TABLE 12

| f | 1.000 | 3.477 | 12.088 |
|---|---|---|---|
| Fno. | 1.850 | 2.753 | 3.500 |
| ω | 39.111 | 11.718 | 3.351 |
| D10 | 0.226 | 3.188 | 5.035 |
| D15 | 5.144 | 2.182 | 0.335 |
| D21 | 1.362 | 0.528 | 1.288 |
| D23 | 0.289 | 1.123 | 0.362 |

Figure 14:
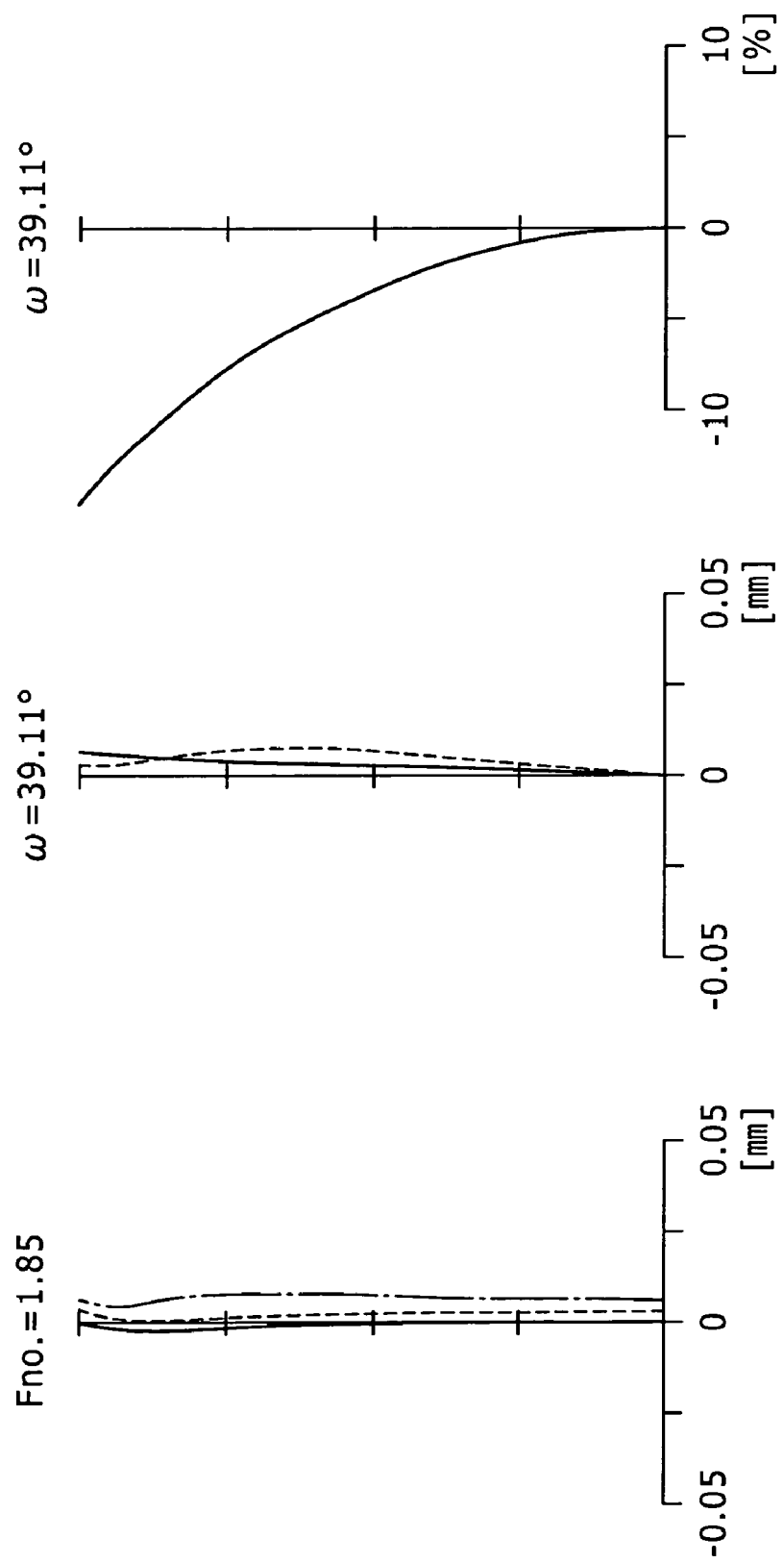
FIGS. 14A to 14C, in conjunction with FIGS. 15A to 15C and 16A to 16C, are diagrams of aberrations of a numerical example in which concrete numerical values are applied to the fourth embodiment, the present diagrams showing spherical aberration, astigmatism, and distortion aberration in a wide-angle end state.
Figure 15:
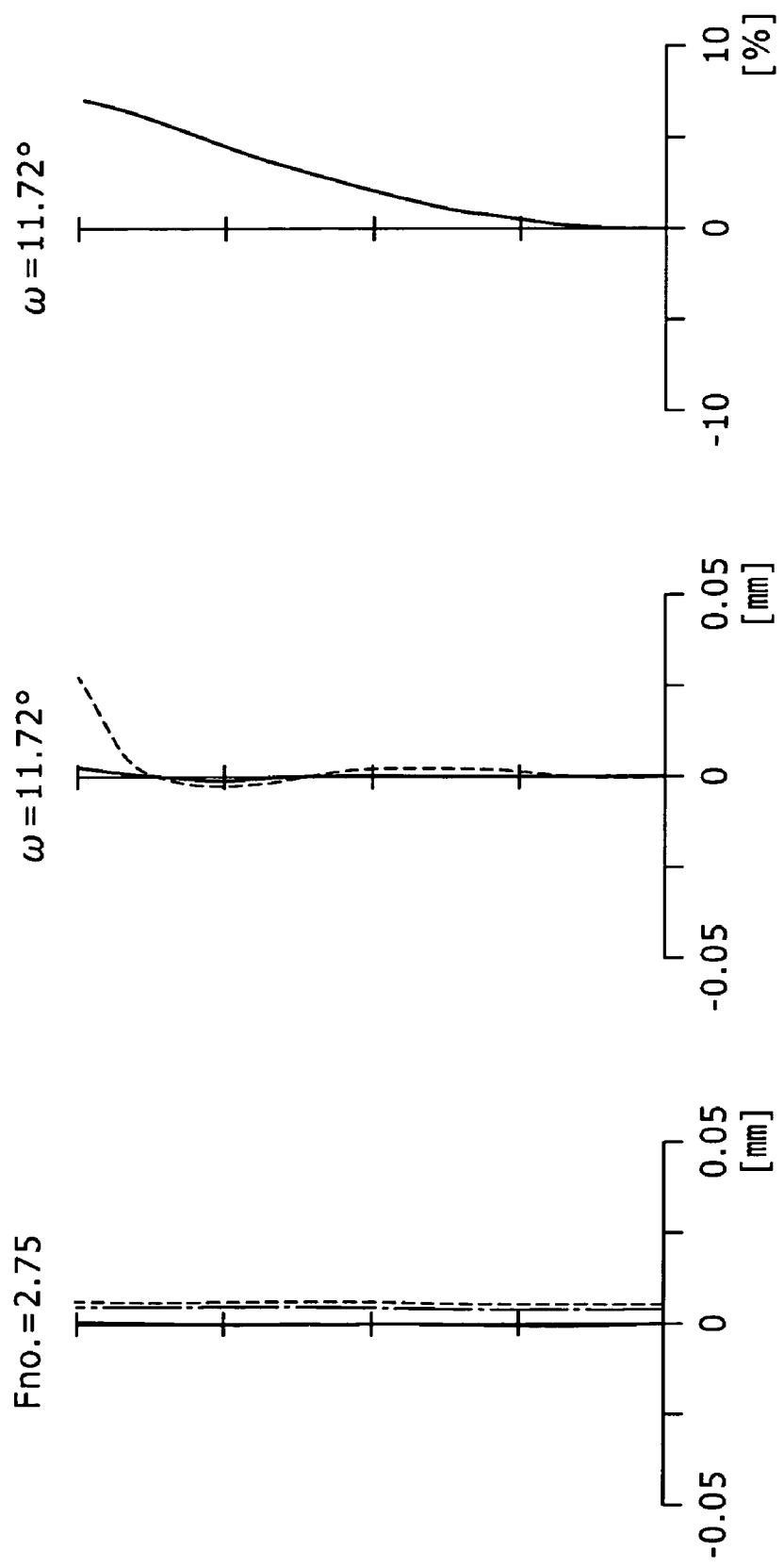
FIGS. 15A to 15C are diagrams showing spherical aberration, astigmatism, and distortion aberration in an intermediate focal length state.
Figure 16:
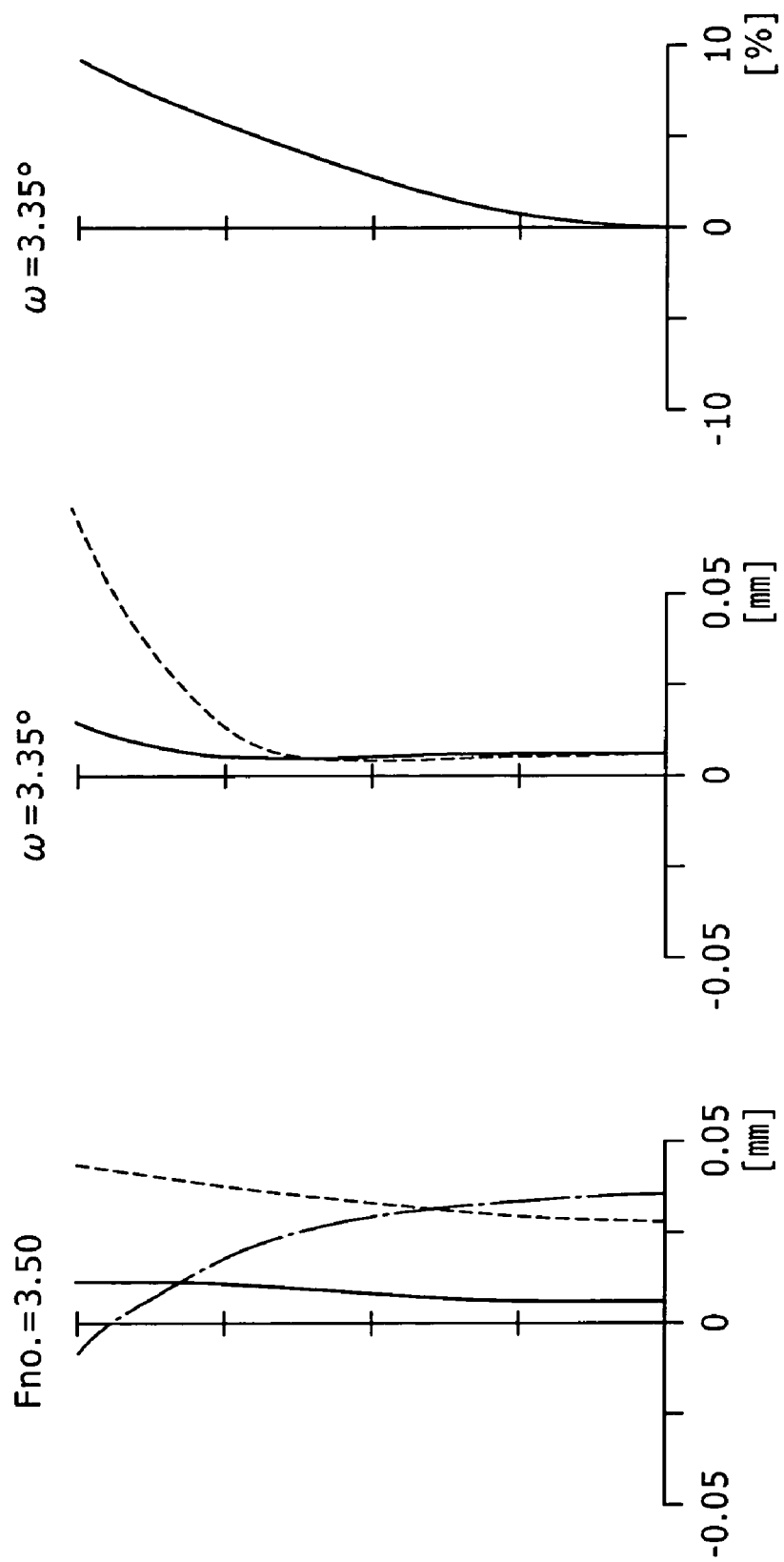
FIGS. 16A to 16C are diagrams showing spherical aberration, astigmatism, and distortion aberration in a telephoto end state.

FIGS. 14A to 16C are diagrams of various aberrations in an infinity focused state of the fourth numerical example. FIGS. 14A to 14C show spherical aberration, astigmatism, and distortion aberration in the wide-angle end state. FIGS. 15A to 15C show spherical aberration, astigmatism, and distortion aberration in the intermediate focal length state. FIGS. 16A to 16C show spherical aberration, astigmatism, and distortion aberration in the telephoto end state.

FIGS. 14A to 16C show values of spherical aberration at a d-line (wavelength of 587.6 nm) by a solid line, values of spherical aberration at a g-line (wavelength of 435.8 nm) by alternate long and short dashed lines, and values of spherical aberration at a C-line (wavelength of 656.3 nm) by a dotted line. FIGS. 14A to 16C show values of astigmatism on a sagittal image surface by a solid line, and show values of astigmatism on a meridional image surface by a dotted line.

It is clear from the aberration diagrams that the fourth numerical example excellently corrects various aberrations and has excellent image forming performance.

[Values of Conditional Expressions in Zoom Lenses]

Values of the conditional expressions in embodiments of the zoom lens according to the present invention and the zoom lens according to the other present invention will be described in the following.

Table 13 shows values of the above-described conditional expressions (1) to (3) in the zoom lenses 1 to 4.

TABLE 13

| | | ZOOM LENS 1 | ZOOM LENS 2 | ZOOM LENS 3 | ZOOM LENS 4 |
|---|---|---|---|---|---|
| CONDITIONAL EXPRESSION (1) | H1' | 0.53 | 0.26 | 0.86 | 0.54 |
| | f1 | 5.77 | 5.91 | 5.87 | 6.53 |
| | H1'/f1 | 0.09 | 0.04 | 0.15 | 0.08 |
| CONDITIONAL EXPRESSION (2) | f2 | −1.50 | −1.49 | −1.62 | −1.49 |
| | fw | 1 | 1 | 1 | 1 |
| | ft | 8.74 | 8.87 | 8.71 | 12.09 |
| | $|f2|/\sqrt{(fw \cdot ft)}$ | 0.51 | 0.50 | 0.55 | 0.43 |
| CONDITIONAL EXPRESSION (3) | f21 | −1.92 | −1.40 | −1.90 | −1.61 |
| | f21/f2 | 1.28 | 0.94 | 1.17 | 1.08 |

As is clear from Table 13, the zoom lenses 1 to 4 satisfy the conditional expressions (1) to (3).

[Configuration of Image Pickup Device]

An image pickup device according to an embodiment of the present invention includes: a zoom lens; and an image pickup element for converting an optical image formed by the zoom lens into an electric signal; the zoom lens being formed by arranging, in order from an object side to an image side, a first lens group having positive refractive power and having a position fixed at all times, a second lens group having negative refractive power and made movable in a direction of an optical axis to vary power, a third lens group having positive refractive power and having a position fixed at all times, a fourth lens group having positive refractive power and made movable in the direction of the optical axis to correct a focal position resulting from power variation and perform focusing, and a fifth lens group having positive refractive power.

In the image pickup device according to the embodiment of the present invention, the first lens group of the zoom lens is formed by arranging a concave lens, a convex lens, a cemented lens of a concave lens and a convex lens, and a convex lens in order from the object side to the image side.

Further, in the image pickup device according to the embodiment of the present invention, the zoom lens satisfies the following conditional expressions (1) and (2):

$$0.03 < H1'/f1 < 0.3 \tag{1}$$

$$0.3 < |f2|/\sqrt{(fw \cdot ft)} < 0.65 \tag{2}$$

where H1' is an interval from a vertex of a surface nearest to the image side in the first lens group to a principal point on the image side of the first lens group (− denotes the object side, and + denotes the image side), f1 is focal length of the first lens group, f2 is focal length of the second lens group, fw is focal length of an entire lens system at a wide-angle end, and ft is the focal length of the entire lens system at a telephoto end.

The conditional expression (1) shows a condition for imparting a configuration suitable for achieving both an increase in angle of view and miniaturization of the lens nearest to the object side to the first lens group.

When H1'/f1 is less than the lower limit of the conditional expression (1), an interval between the principal points of the first lens group and the second lens group is increased, and therefore an increase in angle of view becomes difficult.

When H1'/f1 exceeds the upper limit of the conditional expression (1), on the other hand, the height of off-axis light rays passing through the first lens group is increased, and the diameter of the lens located nearest to the object side in the first lens group is increased.

Thus, when the zoom lens satisfies the conditional expression (1), the refractive power arrangement of each lens is defined such that the image side principal point of the first lens group is located sufficiently nearer to the image side than the surface nearest to the image surface side in the first lens group, and an increase in angle of view and miniaturization of the lens nearest to the object side in the first lens group can both be achieved.

The conditional expression (2) defines the refractive power of the second lens group functioning mainly as a power varying lens group.

When |f2|/√(fw·ft) is less than the lower limit of the conditional expression (2), the refractive power of the second lens group becomes too strong, a Petzval sum is increased to a negative side, and the correction of field curvature becomes difficult.

When |f2|/·(fw·ft) exceeds the upper limit of the conditional expression (2), on the other hand, the refractive power of the second lens group becomes too weak, and an amount of travel of the second lens group needs to be increased to achieve a desired variable power ratio, thus inviting an increase in size of the zoom lens.

Thus, when the zoom lens satisfies the conditional expression (2), the refractive power of the second lens group is made appropriate. It is therefore possible to excellently correct field curvature and miniaturize the zoom lens with the amount of travel of the second lens group reduced.

Being formed as described above, the zoom lens in the image pickup device according to the embodiment of the present invention can achieve a variable power ratio of 8 to 20 times and a half angle of view of 35° to 45°.

An image pickup device according to an embodiment of the other present invention includes: a zoom lens; and an image pickup element for converting an optical image formed by the zoom lens into an electric signal; the zoom lens being formed by arranging, in order from an object side to an image side, a first lens group having positive refractive power and having a position fixed at all times, a second lens group having negative refractive power and made movable in a direction of an optical axis to vary power, a third lens group having positive refractive power and having a position fixed at all times, a fourth lens group having positive refractive power and made movable in the direction of the optical axis to correct a focal position resulting from power variation and perform focusing, and a fifth lens group having a movable group made movable in a direction perpendicular to the optical axis and having positive refractive power.

In the image pickup device according to the embodiment of the present invention, the first lens group of the zoom lens is formed by arranging a concave lens, a convex lens, a cemented lens of a concave lens and a convex lens, and a convex lens in order from the object side to the image side.

Further, in the image pickup device according to the embodiment of the present invention, the second lens group of the zoom lens is formed by arranging a biconcave lens and a cemented lens of a biconcave lens and a biconvex lens in order from the object side to the image side.

In addition, in the image pickup device according to the embodiment of the other present invention, the zoom lens satisfies the following conditional expressions (1), (2), and (3):

$$0.03 < H1'/f1 < 0.3 \tag{1}$$

$$0.3 < |f2|/\sqrt{(fw \cdot ft)} < 0.65 \tag{2}$$

$$0.8 < f21/f2 < 1.6 \tag{3}$$

where H1' is an interval from a vertex of a surface nearest to the image side in the first lens group to a principal point on the image side of the first lens group (− denotes the object side, and + denotes the image side), f1 is focal length of the first lens group, f2 is focal length of the second lens group, fw is focal length of an entire lens system at a wide-angle end, ft is the focal length of the entire lens system at a telephoto end, and f21 is focal length of the lens located nearest to the object side in the second lens group.

The conditional expression (1) shows a condition for imparting a configuration suitable for achieving both an increase in angle of view and miniaturization of the lens nearest to the object side to the first lens group.

When H1'/f1 is less than the lower limit of the conditional expression (1), an interval between the principal points of the first lens group and the second lens group is increased, and therefore an increase in angle of view becomes difficult.

When H1'/f1 exceeds the upper limit of the conditional expression (1), on the other hand, the height of off-axis light rays passing through the first lens group is increased, and the diameter of the lens located nearest to the object side in the first lens group is increased.

Thus, when the zoom lens satisfies the conditional expression (1), the refractive power arrangement of each lens is defined such that the image side principal point of the first lens group is located sufficiently nearer to the image side than the surface nearest to the image surface side in the first lens group, and an increase in angle of view and miniaturization of the lens nearest to the object side in the first lens group can both be achieved.

The conditional expression (2) defines the refractive power of the second lens group functioning mainly as a power varying lens group.

When |f2|/√(fw·ft) is less than the lower limit of the conditional expression (2), the refractive power of the second lens group becomes too strong, a Petzval sum is increased to a negative side, and the correction of field curvature becomes difficult.

When |f2|/·(fw·ft) exceeds the upper limit of the conditional expression (2), on the other hand, the refractive power of the second lens group becomes too weak, and an amount of travel of the second lens group needs to be increased to achieve a desired variable power ratio, thus inviting an increase in size of the zoom lens.

Thus, when the zoom lens satisfies the conditional expression (2), the refractive power of the second lens group is made appropriate. It is therefore possible to excellently correct field curvature and miniaturize the zoom lens with the amount of travel of the second lens group reduced.

The conditional expression (3) defines a ratio between the refractive power of the second lens group and the refractive power of the biconcave lens located nearest to the object side in the second lens group.

When f21/f2 exceeds the upper limit of the conditional expression (3), the refractive power of the biconcave lens located nearest to the object side in the second lens group becomes too weak, the height of off-axis light rays passing through the first lens group is increased when a wider angle of view is to be achieved, and the lens located nearest to the object side in the first lens group is increased in size.

When f21/f2 is less than the lower limit of the conditional expression (3), on the other hand, the refractive power of the biconcave lens located nearest to the object side in the second lens group becomes too strong, and the correction of aberration attendant on power variation becomes difficult.

Thus, when the zoom lens satisfies the conditional expression (3), the refractive power of the biconcave lens located nearest to the object side in the second lens group is made appropriate, and it is possible to miniaturize the lens located nearest to the object side in the first lens group and excellently correct aberration attendant on power variation.

In addition, because the fifth lens group has the movable group made movable in the direction perpendicular to the optical axis, the fifth lens group can correct an image blur due to hand movement or the like.

Being formed as described above, the zoom lens in the image pickup device according to the embodiment of the other present invention can achieve a variable power ratio of 8 to 20 times and a half angle of view of 35° to 45°.

[One Embodiment of Image Pickup Device]

Figure 17:
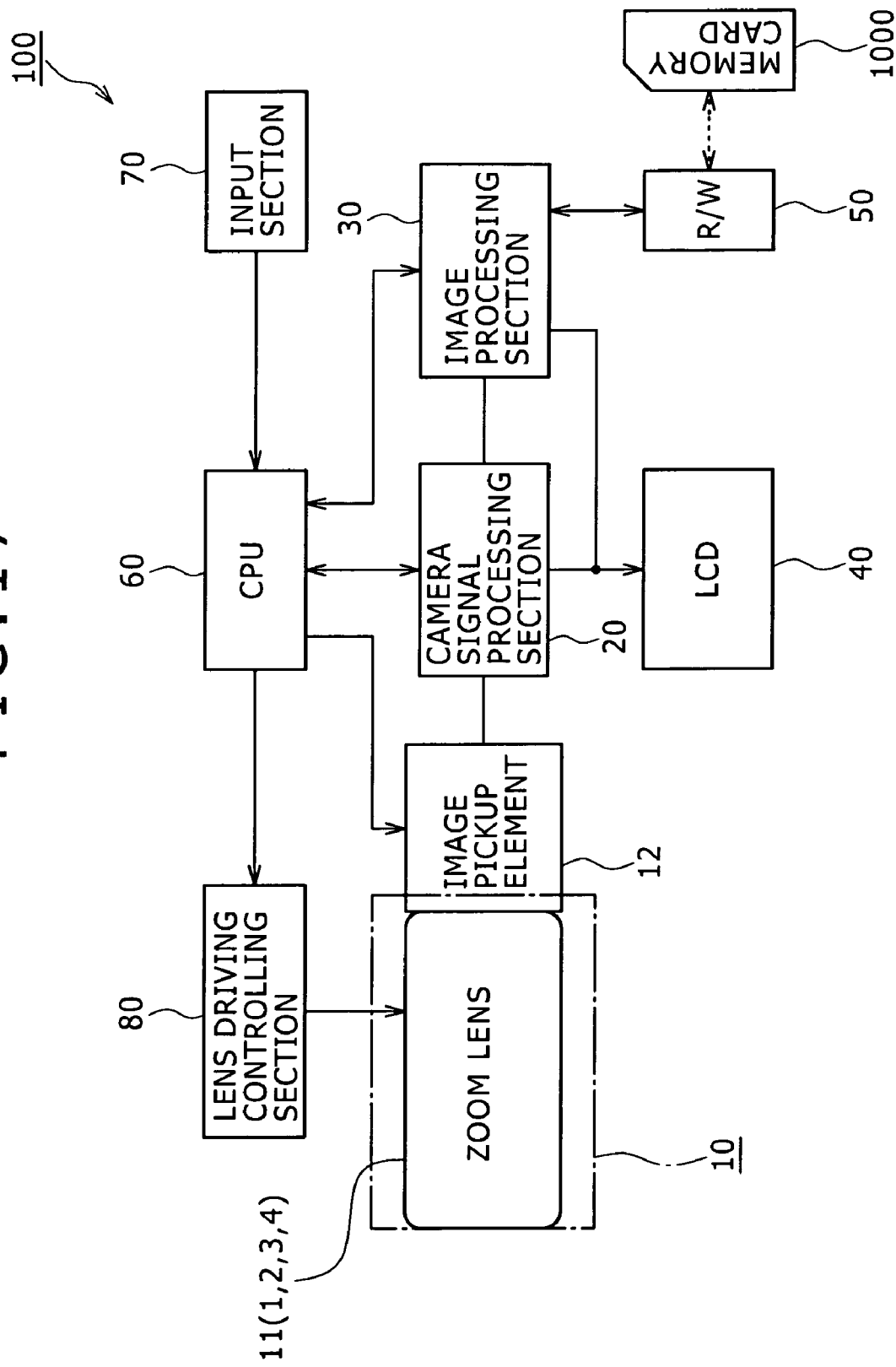
FIG. 17 is a block diagram showing an embodiment of an image pickup device.

FIG. 17 is a block diagram of a digital still camera according to an embodiment of the image pickup device according to the present invention and the image pickup device according to the other present invention.

The image pickup device (digital still camera) 100 includes a camera block 10 for performing an image pickup function, a camera signal processing section 20 for subjecting a photographed image signal to signal processing such as analog-to-digital conversion and the like, and an image processing section 30 for recording and reproducing the image signal. The image pickup device 100 also includes an LCD (Liquid Crystal Display) 40 for displaying a photographed image and the like, an R/W (reader/writer) 50 for writing and reading an image signal to and from a memory card 1000, a CPU (Central Processing Unit) 60 for controlling the whole of the image pickup device, an input section 70 formed by various switches and the like on which desired operation is performed by a user, and a lens driving control section 80 for controlling the driving of lenses arranged in the camera block 10.

The camera block 10 is formed by an optical system including a zoom lens 11 (the zoom lenses 1, 2, 3, and 4 to which the present invention and the other present invention are applied) and an image pickup element 12 such as a CCD (Charge Coupled Device), a CMOS (Complementary Metal Oxide Semiconductor) or the like.

The camera signal processing section 20 performs various signal processing such as conversion of an output signal from the image pickup element 12 into a digital signal, noise removal, image quality correction, conversion into a luminance signal and a color-difference signal, and the like.

The image processing section 30 performs the processing of compression coding and decompression decoding of an image signal on the basis of a predetermined image data format and the processing of conversion of data specifications such as resolution and the like.

The LCD 40 has a function of displaying a state of operation on the input section 70 by the user and various data such as a photographed image and the like.

The R/W 50 writes image data coded by the image processing section 30 to the memory card 1000 and reads image data recorded in the memory card 1000.

The CPU 60 functions as a control processing section for controlling each circuit block provided in the image pickup device 100. The CPU 60 controls each circuit block on the basis of an instruction input signal from the input section 70 and the like.

The input section 70 includes for example a shutter release button for performing shutter operation and a selecting switch for selecting an operation mode. The input section 70 outputs an instruction input signal corresponding to an operation by the user to the CPU 60.

The lens driving controlling section 80 controls a motor and the like not shown in FIG. 17 for driving each lens of the zoom lens 11 on the basis of a control signal from the CPU 60.

The memory card 1000 is for example a semiconductor memory that can be inserted into and removed from a slot connected to the R/W 50.

Operation of the image pickup device 100 will be described in the following.

In a standby state for picture taking, under control of the CPU 60, an image signal photographed by the camera block 10 is output to the LCD 40 via the camera signal processing section 20 to be displayed as a camera-through image. In addition, when an instruction input signal for zooming is input from the input section 70, the CPU 60 outputs a control signal to the lens driving controlling section 80, so that a predetermined lens in the zoom lens 11 is moved on the basis of control of the lens driving controlling section 80.

When a shutter not shown in FIG. 17 within the camera block 10 is operated according to an instruction input signal from the input section 70, a photographed image signal is output from the camera signal processing section 20 to the image processing section 30, subjected to compression coding processing, and converted into digital data in a predetermined data format. The converted data is output to the R/W 50, and written to the memory card 1000.

Incidentally, focusing is for example performed by the moving of a predetermined lens in the zoom lens 11 by the lens driving controlling section 80 on the basis of a control signal from the CPU 60 when the shutter release button of the input section 70 is pressed halfway down or pressed all the way down for recording (photographing).

When image data recorded in the memory card 1000 is reproduced, the R/W 50 reads the predetermined image data from the memory card 1000 according to an operation of the input section 70, and the image processing section 30 subjects the image data to decompression decoding processing. Thereafter, a reproduced image signal is output to the LCD 40, and a reproduced image is displayed.

It is to be noted that while in the foregoing embodiments, an example has been illustrated in which the image pickup device is applied to a digital still camera, the scope of application of the image pickup device is not limited to digital still cameras. The image pickup device is widely applicable as for example a camera section of digital input-output devices such as digital video cameras, portable telephones including a camera, PDAs (Personal Digital Assistants) including a camera, and the like.

The shapes and numerical values of respective parts shown in each of the foregoing embodiments are each a mere example of embodiment for carrying out the present invention, and the technical scope of the present invention is not to be construed in a restricted manner by these shapes and numerical values.

The present application contains subject matter related to that disclosed in Japanese Priority Patent Application JP 2009-295244 filed in the Japan Patent Office on Dec. 25, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A zoom lens comprising:
a first lens group having positive refractive power and having a position fixed at all times;
a second lens group having negative refractive power and made movable in a direction of an optical axis to vary power;
a third lens group having positive refractive power and having a position fixed at all times;
a fourth lens group having positive refractive power and made movable in the direction of the optical axis to correct a focal position resulting from power variation and perform focusing; and
a fifth lens group having positive refractive power,
said first lens group, said second lens group, said third lens group, said fourth lens group, and said fifth lens group being arranged in order from an object side to an image side,
said first lens group being formed by arranging a concave lens, a convex lens, a cemented lens of a concave lens and a convex lens, and a convex lens in order from the object side to the image side, and
the zoom lens satisfying following conditional expressions (1) and (2), $$0.03 < H1'/f1 < 0.3 \quad (1)$$

$$0.3 < |f2|/\sqrt{(fw \cdot ft)} < 0.65 \quad (2)$$

where H1' is an interval from a vertex of a surface nearest to the image side in the first lens group to a principal point on the image side of the first lens group (− denotes the object side, and + denotes the image side), f1 is focal length of the first lens group, f2 is focal length of the second lens group, fw is focal length of an entire lens system at a wide-angle end, and ft is the focal length of the entire lens system at a telephoto end.

2. The zoom lens according to claim 1, wherein said second lens group is formed by arranging a biconcave lens and a cemented lens of a biconcave lens and a biconvex lens in order from the object side to the image side, and satisfies a following conditional expression (3), $$0.8 < f21/f2 < 1.6 \quad (3)$$

where f21 is focal length of the lens located nearest to the object side in the second lens group.

3. The zoom lens according to claim 1, wherein the lens disposed nearest to the object side in said first lens group is a compound aspheric lens.

4. A zoom lens comprising:
a first lens group having positive refractive power and having a position fixed at all times;
a second lens group having negative refractive power and made movable in a direction of an optical axis to vary power;
a third lens group having positive refractive power and having a position fixed at all times;
a fourth lens group having positive refractive power and made movable in the direction of the optical axis to correct a focal position resulting from power variation and perform focusing; and
a fifth lens group having a movable group made movable in a direction perpendicular to the optical axis and having positive refractive power,
said first lens group, said second lens group, said third lens group, said fourth lens group, and said fifth lens group being arranged in order from an object side to an image side,
said first lens group being formed by arranging a concave lens, a convex lens, a cemented lens of a concave lens and a convex lens, and a convex lens in order from the object side to the image side,
said second lens group being formed by arranging a biconcave lens and a cemented lens of a biconcave lens and a biconvex lens in order from the object side to the image side, and
the zoom lens satisfying following conditional expressions (1), (2), and (3), $$0.03 < H1'/f1 < 0.3 \quad (1)$$

$$0.3 < |f2|/\sqrt{(fw \cdot ft)} < 0.65 \quad (2)$$

$$0.8 < f21/f2 < 1.6 \quad (3)$$

where H1' is an interval from a vertex of a surface nearest to the image side in the first lens group to a principal point on the image side of the first lens group (− denotes the object side, and + denotes the image side), f1 is focal length of the first lens group, f2 is focal length of the second lens group, fw is focal length of an entire lens system at a wide-angle end, ft is the focal length of the entire lens system at a telephoto end, and f21 is focal length of the lens located nearest to the object side in the second lens group.

5. The zoom lens according to claim 4, wherein the lens disposed nearest to the object side in said first lens group is a compound aspheric lens.

6. The zoom lens according to claim 4, wherein said fifth lens group is formed by arranging a front group having negative refractive power and a rear group having positive refractive power in order from the object side to the image side, and
one of said front group and said rear group of said fifth lens group is said movable group moving in the direction perpendicular to the optical axis, so that an image formed on an image surface is movable in the direction perpendicular to the optical axis.

7. An image pickup device comprising:
a zoom lens; and
an image pickup element for converting an optical image formed by said zoom lens into an electric signal;
said zoom lens being formed by arranging, in order from an object side to an image side, a first lens group having positive refractive power and having a position fixed at all times, a second lens group having negative refractive power and made movable in a direction of an optical axis to vary power, a third lens group having positive refractive power and having a position fixed at all times, a fourth lens group having positive refractive power and made movable in the direction of the optical axis to correct a focal position resulting from power variation and perform focusing, and a fifth lens group having positive refractive power;

said first lens group being formed by arranging a concave lens, a convex lens, a cemented lens of a concave lens and a convex lens, and a convex lens in order from the object side to the image side; and the zoom lens satisfying following conditional expressions (1) and (2), $$0.03 < H1'/f1 < 0.3 \tag{1}$$

$$0.3 < |f2|/\sqrt{(fw \cdot ft)} < 0.65 \tag{2}$$

where H1' is an interval from a vertex of a surface nearest to the image side in the first lens group to a principal point on the image side of the first lens group (− denotes the object side, and + denotes the image side), f1 is focal length of the first lens group, f2 is focal length of the second lens group, fw is focal length of an entire lens system at a wide-angle end, and ft is the focal length of the entire lens system at a telephoto end.

8. An image pickup device comprising:

a zoom lens; and an image pickup element for converting an optical image formed by said zoom lens into an electric signal;

said zoom lens being formed by arranging, in order from an object side to an image side, a first lens group having positive refractive power and having a position fixed at all times, a second lens group having negative refractive power and made movable in a direction of an optical axis to vary power, a third lens group having positive refractive power and having a position fixed at all times, a fourth lens group having positive refractive power and made movable in the direction of the optical axis to correct a focal position resulting from power variation and perform focusing, and a fifth lens group having a movable group made movable in a direction perpendicular to the optical axis and having positive refractive power;

said first lens group being formed by arranging a concave lens, a convex lens, a cemented lens of a concave lens and a convex lens, and a convex lens in order from the object side to the image side;

said second lens group being formed by arranging a biconcave lens and a cemented lens of a biconcave lens and a biconvex lens in order from the object side to the image side; and the zoom lens satisfying following conditional expressions (1), (2), and (3), $$0.03 < H1'/f1 < 0.3 \tag{1}$$

$$0.3 < |f2|/\sqrt{(fw \cdot ft)} < 0.65 \tag{2}$$

$$0.8 < f21/f2 < 1.6 \tag{3}$$

where H1' is an interval from a vertex of a surface nearest to the image side in the first lens group to a principal point on the image side of the first lens group (− denotes the object side, and + denotes the image side), f1 is focal length of the first lens group, f2 is focal length of the second lens group, fw is focal length of an entire lens system at a wide-angle end, ft is the focal length of the entire lens system at a telephoto end, and f21 is focal length of the lens located nearest to the object side in the second lens group.

\* \* \* \* \*